(12) United States Patent
Anderson et al.

(10) Patent No.: US 7,395,252 B2
(45) Date of Patent: Jul. 1, 2008

(54) INNERVATED STOCHASTIC CONTROLLER FOR REAL TIME BUSINESS DECISION-MAKING SUPPORT

(75) Inventors: Roger N. Anderson, New York, NY (US); Albert Boulanger, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 11/349,711

(22) Filed: Feb. 8, 2006

(65) Prior Publication Data
US 2007/0094187 A1    Apr. 26, 2007

Related U.S. Application Data

(63) Continuation of application No. PCT/US2004/028185, filed on Aug. 26, 2004.

(60) Provisional application No. 60/497,834, filed on Aug. 26, 2003.

(51) Int. Cl.
G06F 17/00 (2006.01)
G06N 5/00 (2006.01)

(52) U.S. Cl. .............................. 706/45; 706/46; 706/52

(58) Field of Classification Search .................. 706/45, 706/46, 52; 705/7
See application file for complete search history.

(56) References Cited

U.S. PATENT DOCUMENTS 5,625,751 A    4/1997  Brandwajn et al.
5,875,431 A  * 2/1999  Heckman et al. ................ 705/7
6,154,731 A  * 11/2000 Monks et al. ............. 705/36 R
6,169,981 B1 * 1/2001  Werbos ........................ 706/23
6,308,162 B1 * 10/2001 Ouimet et al. .................. 705/7
6,311,144 B1 * 10/2001 Abu El Ata .................... 703/2
6,321,205 B1 * 11/2001 Eder ............................ 705/7
6,807,537 B1 * 10/2004 Thiesson et al. .............. 706/52

OTHER PUBLICATIONS

Stephen Shervais et al., Adaptive Critic based Adaptation of a Fuzzy Policy Manager for a Logistic System, 2001, IEEE, 0-7803-7078, 568-573.*
Shervais, S., "Adaptive Critic Based Adaption Of A Fuzzy Policy Manager For A Logistic System," IEEE 0-7803-7078-3/01, 2001.

* cited by examiner

Primary Examiner—Joseph P Hirl
(74) Attorney, Agent, or Firm—Baker Botts LLP; Manu J. Tejwani

(57) ABSTRACT

An Innervated Stochastic Controller optimizes business decision-making under uncertainty through time. The Innervated Stochastic Controller uses a unified reinforcement learning algorithm to treat multiple interconnected operational levels of a business process in a unified manner. The Innervated Stochastic Controller generates actions that are optimized with respect to both financial profitability and engineering efficiency at all levels of the business process. The Innervated Stochastic Controller can be configured to evaluate real options. In one embodiment of the invention, the Innervated Stochastic Controller is configured to generate actions that are martingales. In another embodiment of the invention, the Innervated Stochastic Controller is configured as a computer-based learning system for training power grid operators to respond to grid exigencies.

26 Claims, 16 Drawing Sheets

| DETECTION METHODS | DETECTION METHODS | | | | VARIANCE DETECTION RATINGS | | | |
|---|---|---|---|---|---|---|---|---|
| | 4 | 8 | 8 | 6 | 5 | 4 | 5 | |
| PROBLEMS ↓ | TORQUE ON PUMP | CASING PRESSURE, VIBRATION IN DOWNHOLE PRODUCING ZONES | TEMPERATURE AT WELLHEAD | TEMPERATURE IN DOWNHOLE PRODUCING ZONES | TOTAL FLOW AT WELLHEAD | TOTAL FLOW INTO EACH DOWNHOLE PRODUCING ZONE | TOTAL WATER PRODUCTION AT WELLHEAD | |
| ELECTRIC SUBMERSIBLE PUMP PROBLEM | 3 | 3 | 2 | 2 | 4 | 4 | 2 | |
| WATER OIL RATIO INCREASE | 1 | 1 | 1 | 1 | 3 | 3 | 5 | |
| SCALING INCREASE | 2 | 2 | 1 | 1 | 4 | 4 | 1 | |
| FLOW RATE DROP | 4 | 4 | 2 | 2 | 5 | 5 | 3 | |
| GAS OIL RATIO INCREASE | 3 | 3 | 1 | 1 | 4 | 4 | 1 | |
| 3 PHASE HOLDUP | 4 | 4 | 2 | 2 | 4 | 4 | 1 | |
| GAS LIFT PROBLEM | 4 | 3 | 1 | 1 | 4 | 4 | 1 | |
| SAND DETECTION | 5 | 4 | 1 | 1 | 5 | 5 | 1 | |
| SKIN DAMAGE | 5 | 4 | 1 | 1 | 5 | 5 | 1 | |
| INJECTION WELL BACKUP | 3 | 2 | 1 | 1 | 3 | 4 | 1 | |
| DROP IN PRODUCTION FROM ONE LATERAL | 3 | 3 | 1 | 1 | 3 | 4 | 2 | |
| DROP IN PRODUCTION FROM MULTILATERALS | 3 | 3 | 2 | 1 | 3 | 4 | 2 | |
| UNUSUAL PRODUCING PRESSURE DROP | 4 | 4 | 2 | 1 | 4 | 5 | 1 | |
| WELL PUMP-OFF | 4 | 4 | 1 | 2 | 5 | 5 | 1 | |

FIG.5

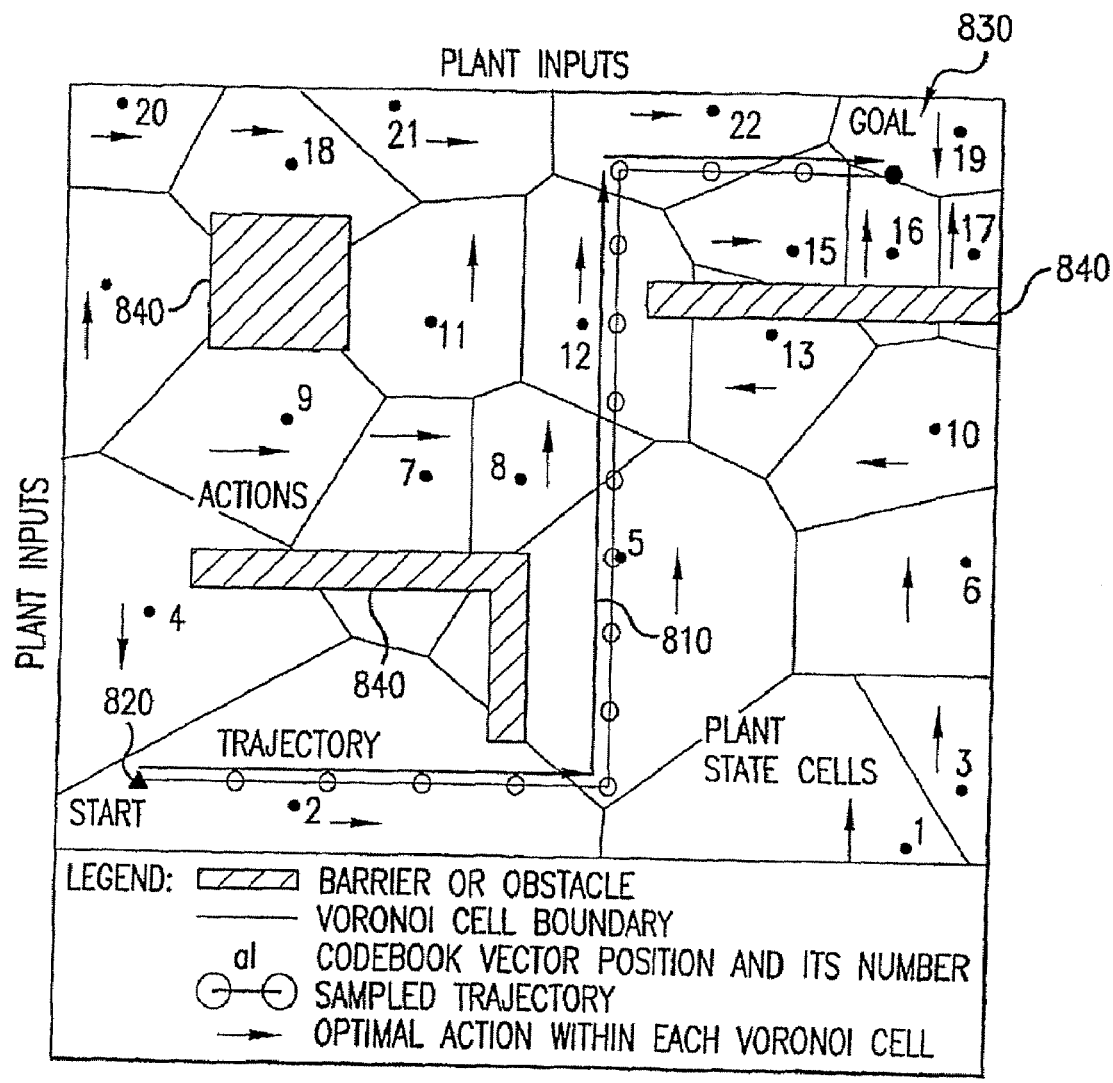

1. THE CODEBOOK DEFINES THE PROBLEM CELLS AT RIGHT, USING THE VECTOR QUANTIZATION ALGORITHM. THE SET OF ARROWS REPRESENTING THE OPTIMAL ACTION FOR EACH CELL IS THE *POLICY*. THE SET OF ACTIONS TAKEN IS THE TRAJECTORY. CELLS ARE CONTINUALLY REDEFINED AS NEW INFORMATION COMES IN AND IS "DISCRETIZED", THUS REDUCING THE DIMENSIONALITY OF THE PLANT INPUTS.

2. THEN THE CONTROLLER LEARNS THE APPROPRIATE RESPONSES FOR CONTROL USING THE REINFORCEMENT LEARNING ALGORITHM.

FIG.8

- *OPTIMAL ACTION SET OR POLICY (D).* WE USE REINFORCEMENT LEARNING WHICH IS A TYPE OF DYNAMIC PROGRAMMING. ITS TASK IS TO LEARN THE OPTIMAL SET OF ACTIONS GUIDED BY THE CRITIC EVALUATION SIGNAL GENERATED BY THE CRITIC FUNCTION. THE OPTIMAL SET OF ACTIONS IS CALLED A POLICY IN DYNAMIC PROGRAMMING.
- *PLANT STATE VECTOR (A).* SET OF MEASURES OF PLANT STATE, CONSISTING OF VARIABLE VALUES FOR PLANT COMPONENTS AND ALSO ID AND TYPE OF COMPONENT EITHER SEPARATELY OR INCLUDED.
- *PLANT ACTION VECTOR (C,D).* SET OF VALUES OR MESSAGES NEEDED TO SET THE SET OF PLANT COMPONENTS INTO A DESIRED STATE FOR EACH COMPONENT. THIS IS HOW THE LEARNING SYSTEM TAKES ACTION ON THE PLANT.
  - (C) ONE KIND OF ACTION IS TO INITIALIZE THE PLANT INTO A DESIRED STATE. THIS WILL BE DONE BY HAVING NAMED CONFIGURATIONS OF THE PLANT IMPLEMENTED USING CONFIGURATION TABLES. THIS IS USED TO (RE)INITIALIZE THE PLANT TO "PLAY IT AGAIN".
  - (D) ANOTHER KIND OF ACTION IS TO EXECUTE OPTIMAL ACTION FROM THE POLICY GIVEN THE CURRENT STATE OF THE PLANT. THUS, THIS REQUIRES A REPRESENTATION OF WHAT CAN BE DONE ON THE PLANT.
- *PLANT SYSTEM ASSESSMENT MEASUREMENTS. (B)* THE CRITIC FUNCTION WILL USE ASSESSMENT MEASUREMENTS OF THE PLANT TO HELP IT IN ITS GENERATION OF THE EVALUATION SIGNAL.

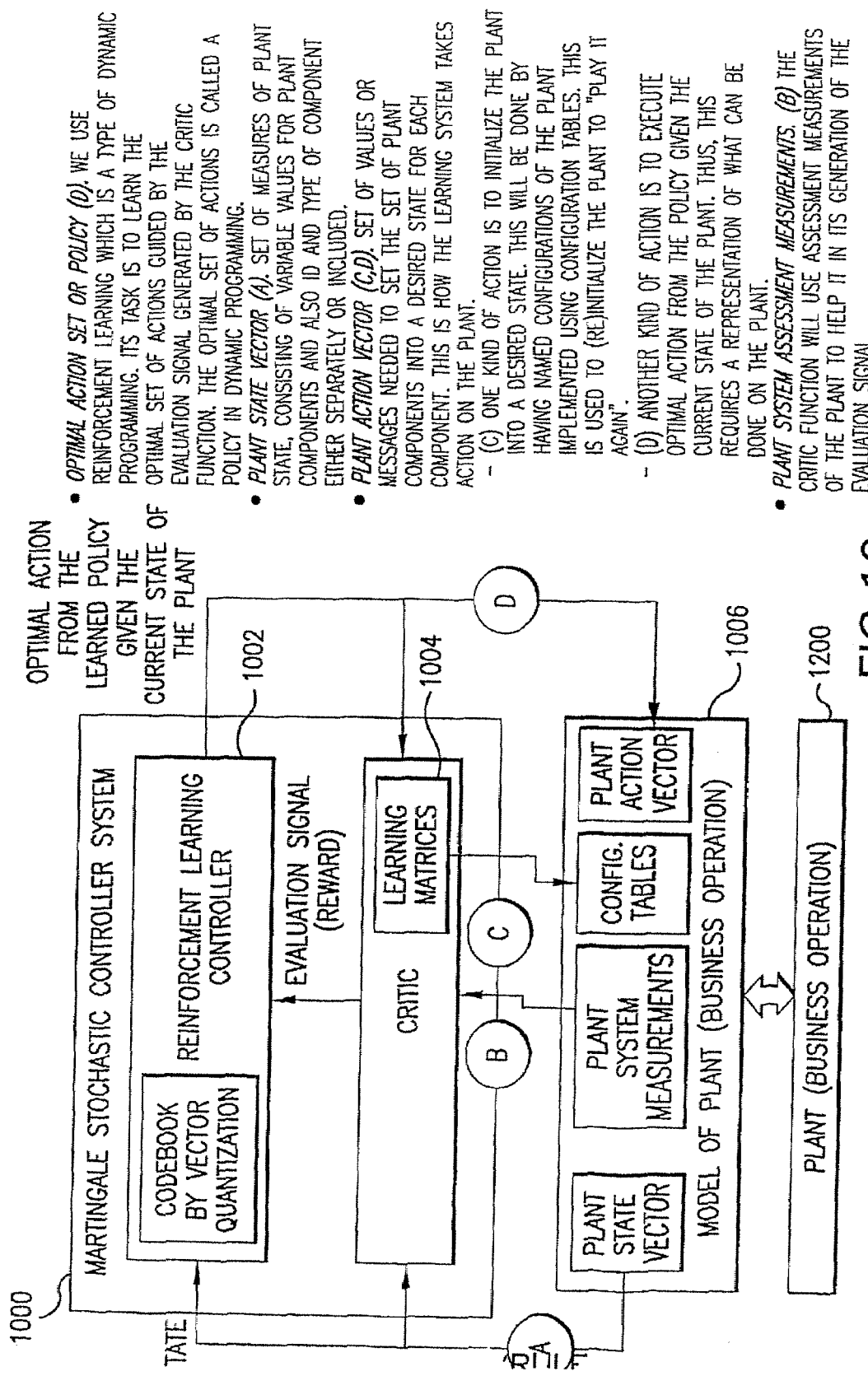

FIG.10

INNERVATED STOCHASTIC CONTROLLER FOR REAL TIME BUSINESS DECISION-MAKING SUPPORT

CROSS-REFERENCE TO RELATED APPLICATIONS

This application is a continuation of International Application Ser. No. PCT/US04/028185, filed Aug. 26, 2004, published Mar. 3, 2005, which claims the benefit of United States provisional application No. 60/497,834 filed Aug. 26, 2003, each of which are incorporated by reference herein in their entireties, and from which priority is claimed.

FIELD OF THE INVENTION

This invention relates to systems and methods for supporting business decision-making in complex and uncertain process environments. More particularly, the invention relates analysis of probable process events and to the prediction of action outcomes to support business and engineering decision-making in the face of uncertainty.

BACKGROUND OF THE INVENTION

A defining characteristic of the modern industrial society is the complexity of business processes that are involved in the production and delivery to market of almost every type of goods or services that are available today. Large or complex business processes are involved in the production and delivery of diverse products ranging, for example, from energy, health care, food, automobiles, sundry goods, telecommunications, music and other media. The business processes are complex not merely because of the physical size of the supply chain to market, but because of the complex array of decision-making variables that can affect production and delivery. For example, in the electric power industry, utility plant operating engineers and managers are faced with a complex array of decision making variables,—arising from deregulated markets, technology change, multiple weather events, physical failure situations and supply anomalies, and now the specter of terrorist attacks across multiple power grids. The variables have impacts of varying scale, e.g., local or global, short term or long term, on the business process. Further, the impact of each variable in real time may be dependent on the state of the other variables.

Conventional systems and methods for supporting decision-making deal with complexity in the business process by treating the business process in fragments. The business process is partitioned by organizational parts or divisions, and by hierarchal levels (e.g., regulatory control, supervisory control, and strategic planning). For example, regulatory control is used at a low level to tactically control local process variables. At the next higher level, supervisory control is used, for example, to optimize production schedules and to co-ordinate activities of different parts of the business process. Scheduling, operation planning, and capacity planning, or strategy functions, which may affect the business process on longer time scales, are carried out at even higher hierarchical levels. The business process decisions made at each level are often supported in isolation on the basis of ad hoc assumptions or static models of the process conditions at the other levels or of the state of other variables at that level. The fragmented approach to the complexity of the business processes can lead to gaps, and missed synergies or common mode interactions, which can affect the efficiency and security of the business process. While the fragmented approach for dealing with complexity may be adequate in static business environments, it does not exploit the potential for real time decision making support that is made possible by increasing investments in computerization and automation of the business processes.

Consideration is now being given to improving prior art systems and methods for business decision support. Attention is particularly directed to integrating supervisory and regulatory control as well as higher level strategy control for decision making under uncertainty in real time. Attention is also directed to integrating real option valuations in the decision making process.

SUMMARY OF THE INVENTION

The invention provides systems and methods for supporting business decisions under uncertainty. A stochastic controller system is used to optimize decision making through time. A unified approximate dynamic programming algorithm using reinforcement learning is implemented to treat multiple interconnected operational levels of a business process in a unified manner. The operational levels of business may, for example, include low levels such as supervisory and regulatory control levels and higher levels such as portfolio management, strategic (capacity) planning, operational planning, and scheduling.

Human decision making knowledge within all the operational levels of the business process can be captured in suitable learning matrices. The leaning matrices include expert knowledge on process situations, actions and outcomes at each level. The learning matrices are chained to obtain a unified representation of the entire business process. The learning matrices are then used as a source of "end games" knowledge (in the sense that computer chess games include a representation of expert play knowledge). A forward model of the business process is used to train the unified reinforcement learning algorithm to generate optimal actions at all levels of the business process. The endgame knowledge in the learning matrices is used to generate learning scenarios for the learning process. The stochastic controller system may include suitable process simulators to exercise the reinforcement learning in training.

The unified reinforcement learning algorithm uses suitable techniques to address the curse of dimensionality problem of dynamic programming algorithms The techniques used may include, for example, Codebooks (Vector Quantization), Neuro-Dynamic Programming (NDP), support vector machines, MAXQ hierarchical reinforcement learning and Lagrangian Decomposition. In one embodiment of the invention, NDP techniques approximate a cost-to-go function using neural networks for function approximation. The reduction in the demand for computational resources using the NDP techniques to approximate the cost-to-go function using neural networks for function approximation, can help the unified reinforcement-learning algorithm to scale with the dimensions of the business process. In another embodiment, support vector machines are used instead of neural networks for function approximation.

The unified reinforcement-learning algorithm may be configured to evaluate opportunities as real options. In one embodiment of the invention, the unified reinforcement learning algorithm processes is configured to generate actions or decisions that are always worth something if exercised immediately (that is they are "in-the-money" in options terminology), with respect to both financial profitability and engineering efficiency. Such in-the-money actions may be used to implement always advancing (non-losing) strategies/ sequences of actions (that are called martingales using terminology from probability theory).

In an application of the present invention, a martingale stochastic controller is configured to carry out remote sub-sea decisions in a real-time affecting the form and timing of gas, oil, and water production in the ultra deepwater. An integrated reservoir asset and production model is developed. The model may include production constraints based, for example, on skin damage and water coning in wells. The stochastic controller is trained to generate flexible production/injection schedules that honor production constraints and produce exemplary field production shapes. The flexible production/injection schedules are optimized on the basis of total economic value increase (real option value+NPV) by the controller.

In another application of the present invention, the innervated stochastic controller is configured as a learning system in computer-based simulation and training tool—Decision Support Threat Simulator (DSTS), for training human operators to make optimal asset management decisions against threats or other exigencies in the business operations. The DSTS may be used for training power grid control operators to maintain the stability of transmission and distribution electric power grids, which are modeled with suitable simulators.

Further, the DSTS can be configured for human-in-the-loop control of the power grid as an adaptive aiding system, which is additionally useful for computer-based training of operators. The principal concepts of adaptive aiding systems are described, for example, in William, B. Rouse, Adaptive aiding for human/computer control, Human Factors, v.30 n. 4, p. 431-443, August 1988. In this configuration, the DSTS can be used to advise or guide operators on what actions to take in the same manner common car navigation systems are used to guide or direct car drivers. The DSTS suggests a control direction to the operators, while the operators operate the subject system being controlled, and further the DSTS also continually tracks the current state of the subject system to provide further control direction suggestions. The DSTS in its adaptive aiding configuration can be used either online while the operators are controlling actual grid operations, in a shadow mode, or offline for training exercises,

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 5 illustrates an exemplary "Detections to Problems" learning matrix for applications in oil and gas field asset management, in accordance with the principles of the present invention;

FIG. 8 schematically illustrates the use of vector quantization to define a vector quantization reinforcement learning (VQRL) codebook that makes high dimensionality computational problems tractable;

FIG. 10 illustrates the general architecture of an Innervated Stochastic Controller architecture in accordance with the principles of the present invention;

DESCRIPTION OF THE INVENTION

The present disclosure provides control systems and methods for supporting business decisions under uncertainty. The business decisions may relate to actions at various levels of the operations in a business process, organization, entity or enterprise. The levels may include, for example, broad strategy levels at the upper ends of a business process and supervisory or regulatory control levels at the lower ends of the business process. The inventive control systems and methods may be used to optimize decision-making through time in the face of uncertainty. The decision-making may be based on a comprehensive consideration of all influencing factors, for example, economic as well as engineering factors, across each level of operations.

Suitable control links may allow rapid or real-time data communications between various levels or parts of a diverse business process, organization, entity or enterprise. The suitable control links may be implemented using, for example, electronic networks, wireless and other data communication technologies. The control links may include human input at one or more levels. Such implementations may advantageously allow business decision-making to be conducted in real time to actively respond to changing process conditions or outlooks.

In the present invention, a subject business process is viewed in a stochastic control framework. Under the stochastic control framework, business process outcomes or events are viewed as probable or stochastic events. The stochastic nature is due to uncertainties that come from both within the organization and external to it, such as markets, prices, risky internal development projects, etc.

Figure 1:
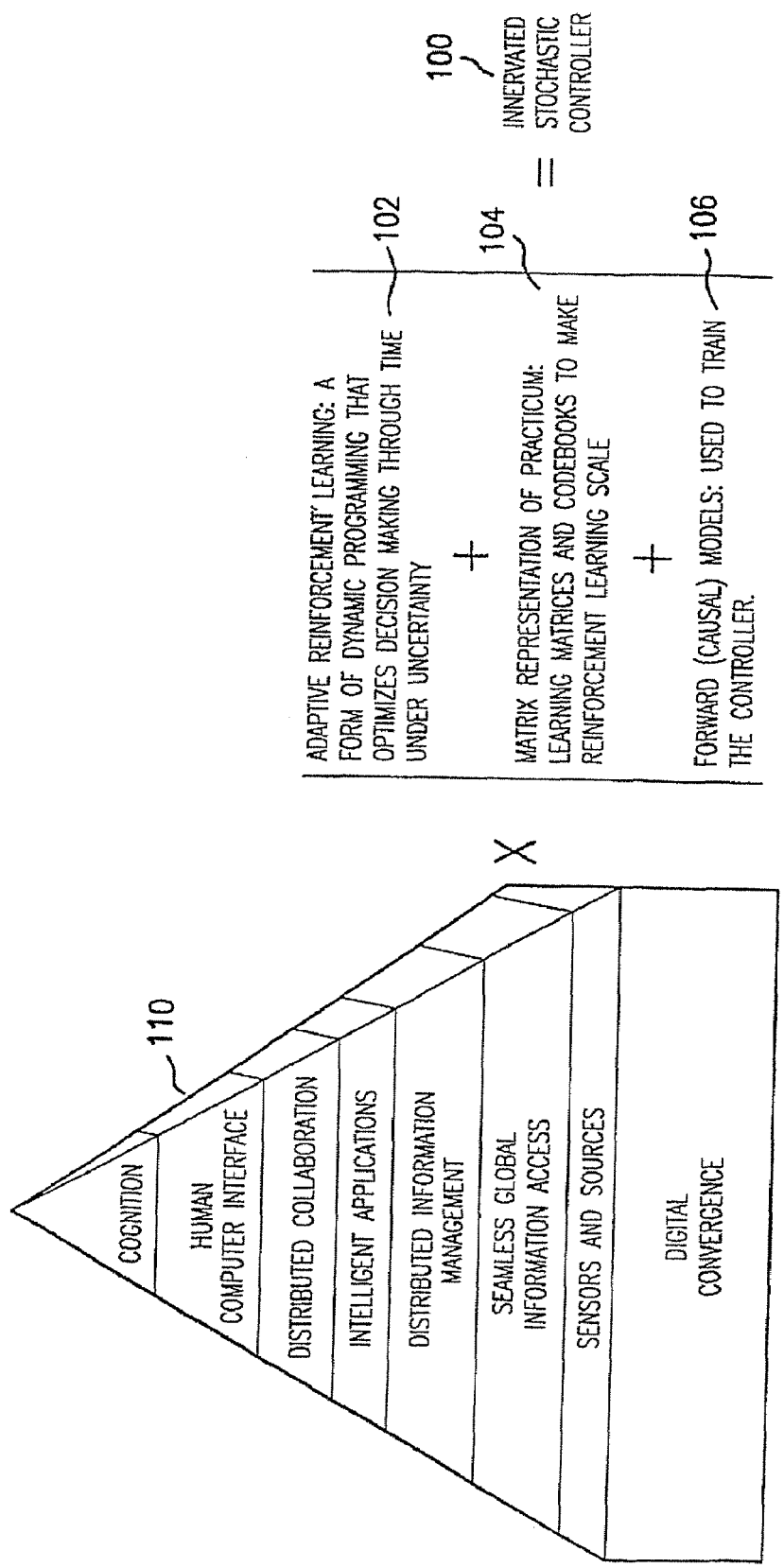
FIG. 1 is an illustration of the elements of an exemplary Innervated Stochastic Controller constructed in accordance with the principles of the present invention.

An adaptable "Innervated" Stochastic Controller (ISC) is developed to optimize decision-making at all levels of the subject business process. (See FIGS. 1 and 10, ISC 100 and ISC system 1000, respectively). The ISC includes a single or integrated algorithm, which has inputs and outputs at all levels of the subject business process.

Figure 2:
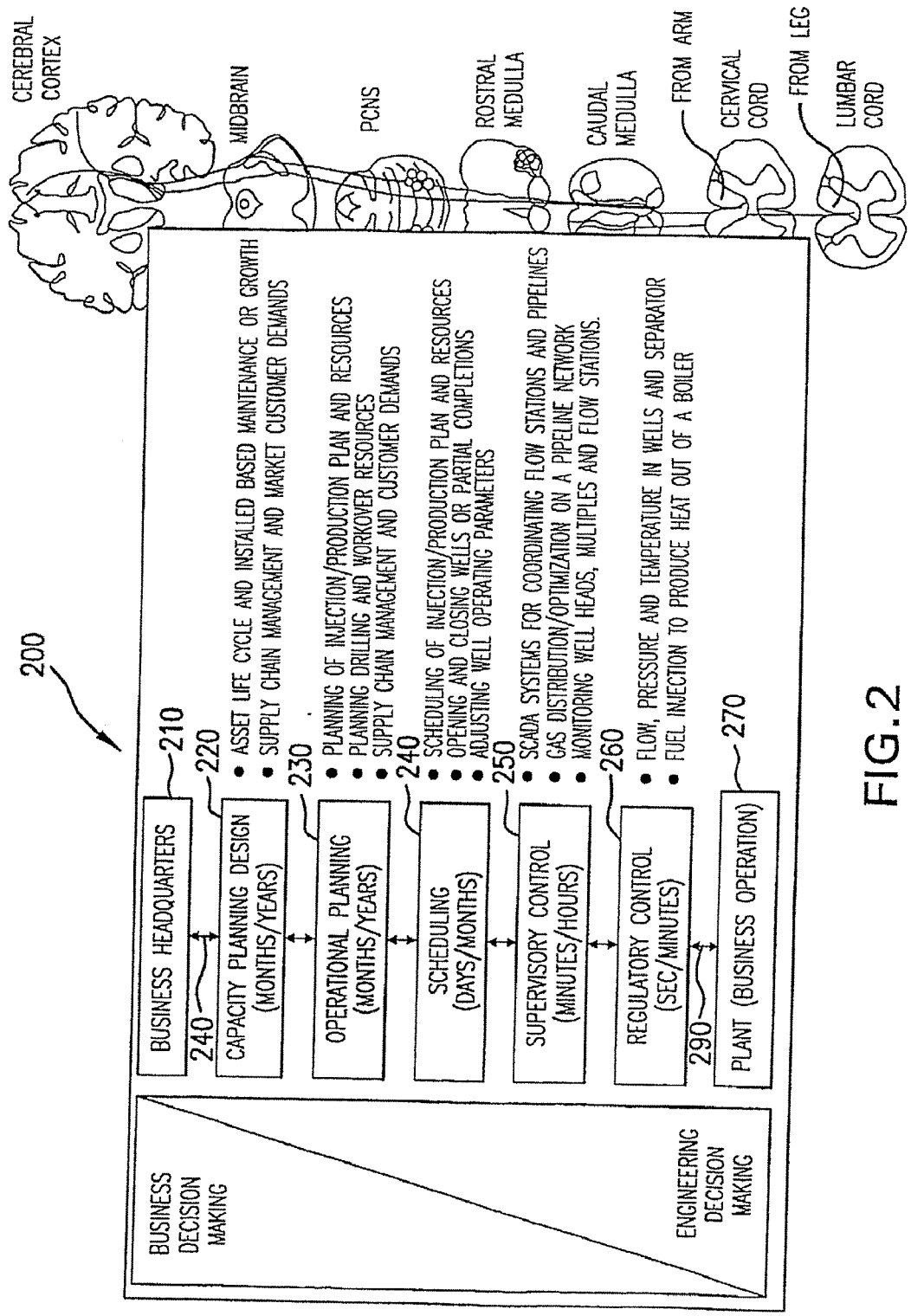
FIG. 2 is an illustration of the multiple levels of operations in a business process that can be controlled by the Innervated Stochastic Controller, in accordance with the principles of the present invention.

It will be understood that the qualifier 'innervated' is used herein in a sense analogous to the conventional dictionary meaning of the word: to supply or stimulate an organ or a body part with nerves. In a manner similar to the distribution of nerves in an animal, to and from its brain, spinal cord and all of its body parts, the ISC provides control links or "nerves" that extend through and connect various levels of a multi-level business process. FIG. 2 shows various operational levels 210-270 of a business enterprise 200. Business enterprise 200, for example, may be in the oil and gas production industry. The various operational levels include business headquarters operation 210, capacity planning design 220, and operational planning 230, scheduling operations 240, supervisory control 250, regulatory control 260 and plant business operations 270. The factors influencing events at each level may involve factors having different time scales. The decision-making at each level involves both a business factor and an engineering factor. The former factor may predominate at the higher levels (e.g., business headquarters level 210). Similarly, the latter factor may predominate at the lower levels (e.g., plant level 270). The various levels are interconnected by control links 290, which are schematically shown in FIG. 2. The innervation of control links 290 throughout the business process is symbolically represented by the figure of the human nervous system, which is shown to the right in FIG. 2.

With reference to FIG. 1, ISC 100 may be represented by three basic blocks or components—an adaptive reinforcement learning ("RL") algorithm 102, a matrix representation 104 of practicum (situation, event and interaction data at all levels of the business process), and a casual training model 106. These blocks or components may be technologically implemented in any conventional or custom-built digital communications environment (e.g., electronic and computing network environment 110) that extends from human cognition to data sensors or data sources in the business operations.

Adaptive RL algorithm 102 uses reinforcement learning (dynamic programming) agent architecture to provide optimal decision-making choices under uncertain conditions. The reinforcement-learning has explicit goals (e.g., a fixed return, NPV, production success), can sense aspects of their environments, and can choose actions to influence their environments. The reinforcement-learning agents map business process situations to business process actions so as to, for example, maximize a numerical reward signal related to an explicit goal. The reinforcement learning agents deployed in RL 102 may be developed using any suitable reinforcement learning techniques that are commonly known, for example, in artificial intelligence, operations research, neural networks, and control systems. Descriptions of several common reinforcement learning techniques and agent architectures may be found, for example, in Richard S. Sutton and Andrew G. Barto, Reinforcement Learning: An Introduction, MIT Press, Cambridge, Mass., 1998.

To treat the various levels of a business process (like that shown in FIG. 2) within an approximate programming framework, the MAXQ method for hierarchical reinforcement learning can be used. (See e.g., Dietterich T., "The MAXQ Method for Hierarchical Reinforcement Learning," Proc. 15th International Conf. on Machine Learning, 1998).

Matrix representation 104 component of ISC 100 includes expert knowledge relating to possible situations, actions and outcomes of the business processes. This expert knowledge may be conveniently cataloged or stored in the form of learning matrices. These learning matrices may represent or correspond to a broad class of maps of the business process, which include, for example, maps of detections or observations to problems, and maps of problems to solutions. FIG. 5 shows an exemplary learning matrix 500, which is useful for asset management in oil and gas production industry. Learning matrix 500 includes expert knowledge, which maps empirical engineering detections or observations in oil and gas field production to, for example, equipment condition or status. Representation of knowledge in the form of learning matrices is known in the art. Here, in ISC 100, learning matrix 500, may be used in the same manner in which spreadsheets are used for generalized backpropagation learning using an "ordered derivatives" approach. (See e.g., Werbos, P. J., Maximizing Long-Term Gas Industry Profits in two Minutes in Lotus using Neural Network Methods, IEEE trans. On Systems, Man, and Cybernetics, Vol. 19, No. 2, 315-333, 1989) ("Werbos").

Figure 3:
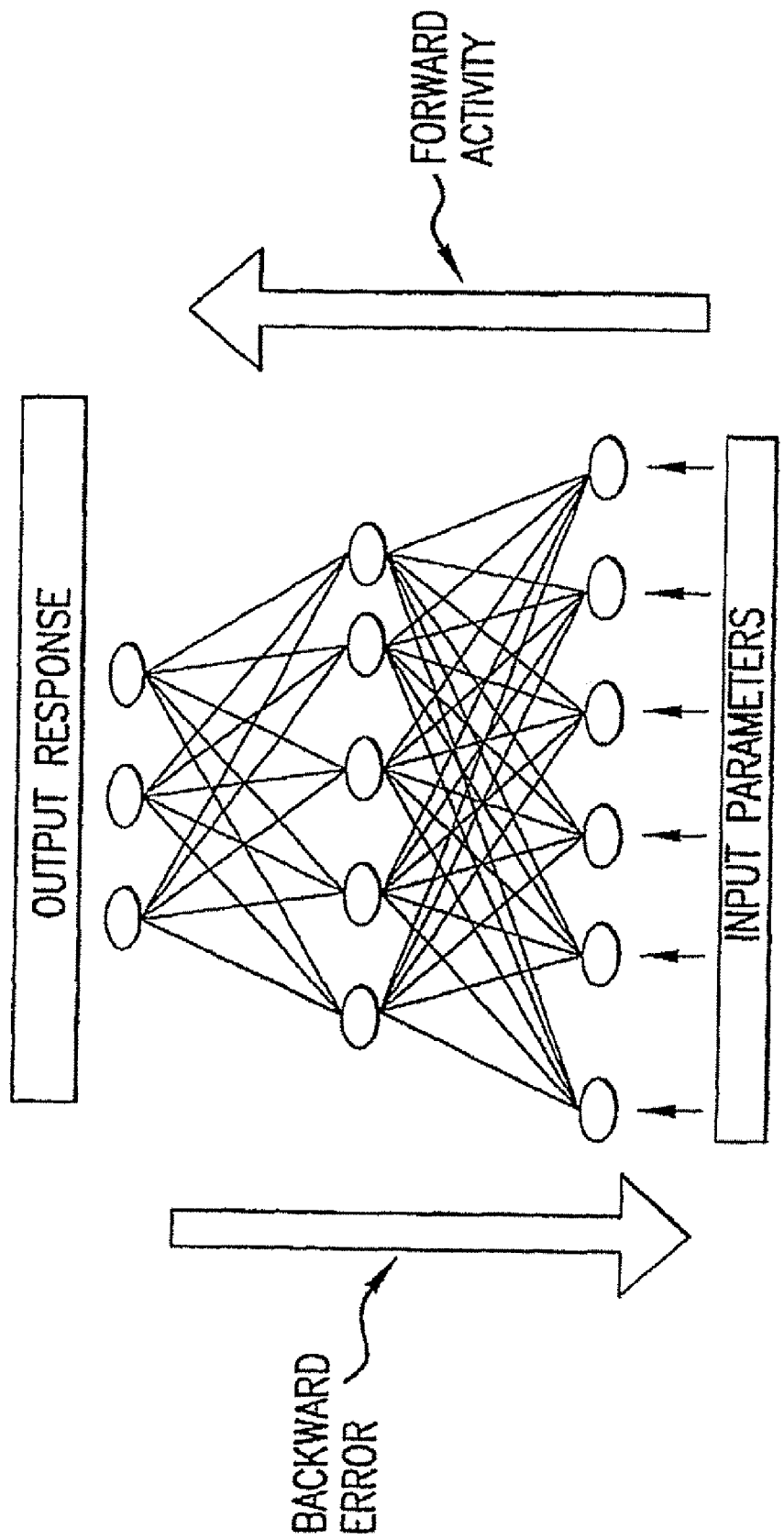
FIG. 3 is an illustration of a two-layer Artificial Neural Network (ANN), which has powerful representational properties that can be used as a universal approximate to approximate a broad class of functions. Two learning matrices chained together can represent the two-layer ANN.

Each learning matrix (e.g., matrix 500) can represent mapping rules for business processes. Further as known in the art, two matrices are needed to represent two layers of a neural network. Similarly, three matrices may be needed to represent three layers of a neural network. (See FIGS. 3 and 4). Two layer ANNs, which correspond to two chained matrices, are known to have very general function approximation abilities. Chaining more than two matrices or adding more than two layers in an ANN may be useful for factoring processes but do not add to the representational power of a two layer ANN. In general mathematical terms, the chained learning matrices are a representation of a generalized functional network. The function of interest in the network may, for example, be a logistic in a neural net, or a summation.

Figure 4:
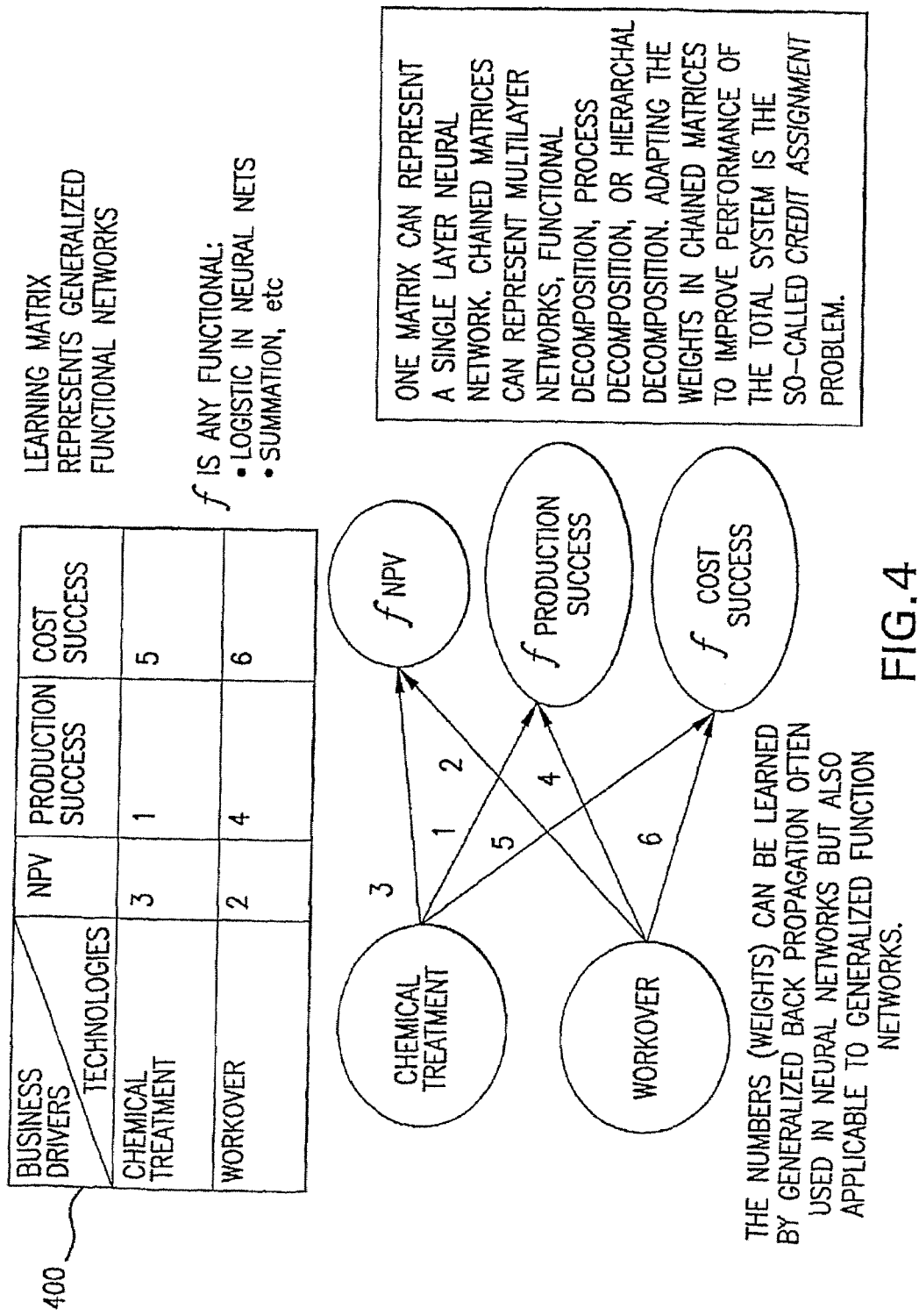
FIG. 4 is an illustration of a learning matrix and a corresponding map representing a single layer neural network. Two learning matrices chained together can represent the two-layer ANN of FIG. 3, in accordance with the principles of the present invention.

The particular learning matrices that are included in matrix representation 104 component of ISC 100 may be combined or chained together to represent "common mode" interactions within different parts of the business process. The chained learning matrices can provide a universal approximate to represent the entire business process. For example, chaining a 'detection to problem' matrix with a 'problems to solutions' matrix generates a map for 'detections to solutions'. FIG. 4 shows another exemplary learning matrix 400, which relates actions (e.g., chemical treatment and work over) to business objectives (e.g., NPV, exploration success and drilling success). The values of chained learning matrix 400 may be weights that are assigned to the matrices in the chain, for example, in the manner of the so-called credit assignment problem in machine learning theory. Known computational solutions (e.g., back propagation) may be used for computing the assigned weights. In an embodiment of the present invention, computational solutions are based on the generalized notion of backpropagation using chained matrices and ordered derivatives, which is described in the works of P. J. Werbos.

A business process can have an enormous number of inputs (dimensions). Conventional dynamic programming techniques that are useful for reinforcement learning can be computationally prohibitive because of the well known "curse of dimensionality." In an embodiment of ISC 100 (e.g., FIG. 10 Martingale Stochastic Controller System (MSC) system 1000), the curse of dimensionality is avoided by adopting using an approximate dynamic programming approach to reinforcement learning such as neuro-dynamic programming (NDP). The NDP approach may be used, for example, for evaluation of cost-to-go functions that useful for decision-making. Additionally, vector quantization techniques within reinforcement learning (e.g., VQRL) may be used to reduce the dimensionality of the input space. VQRL advantageously avoids over fitting of data exploiting the ability of vector quantization to generalize from quantized data. Other suitable reinforcement learning techniques such as the "MAXQ" method for hierarchical reinforcement learning also may be used. Similarly, the curse of dimensionality problem also may be addressed by adopting suitable methods from other disciplines such as the Langrangian Decomposition method in stochastic programming. Of particular utility in one approach to address the curse of dimensionality, may be a range of approximations developed by Powell and Van Roy, who generalize methods from the discipline of dynamic vehicle allocation to general approximate dynamic programming. This range of approximations can effectively approximate value of the dynamic programming function $Qt(x)$, at each time period, to yield a form of the dynamic programming approximation method. This approach can deal with thousands of dimensions. (See e.g., W. B. Powell and B. Van Roy, "Approximate Dynamic Programming for High-Dimensional Dynamic Resource Allocation Problems," in *Handbook of Learning and Approximate Dynamic Programming*, edited by J. Si, A. G. Barto, W. B. Powell, and D. Wunsch, Wiley-IEEE Press, Hoboken, N.J., 2004).

ISC 100 may use suitable simulations or models (e.g., FIG. 6 forward model 620) of the business operations under its control for reinforcement learning. A suitable computer simulator may be integrated with ISC 100 as a computer learning system. ISC 100 may learn from experience gained by computer simulations of business outcomes in response to flexible engineering decisions. For example, in oil and gas field asset management applications, an Integrated Production Model (IPM) may be used to model the ultra deep water assets (e.g., reservoirs), the reservoir to surface plumbing, and the operation of the assets at the sea-floor. The IPM may be used to train ISC 100 for optimal management of assets that are at a remote location.

Figure 6:
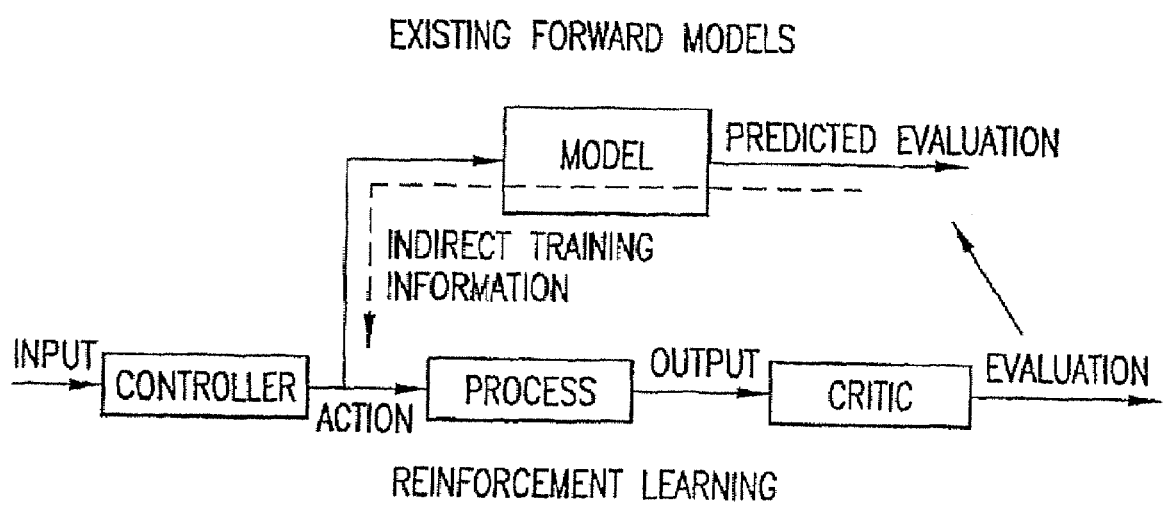
FIG. 6 schematically illustrates the role of models in the operation of the Innervated Stochastic Controller in accordance with the principles of the present invention.
Figure 7A:
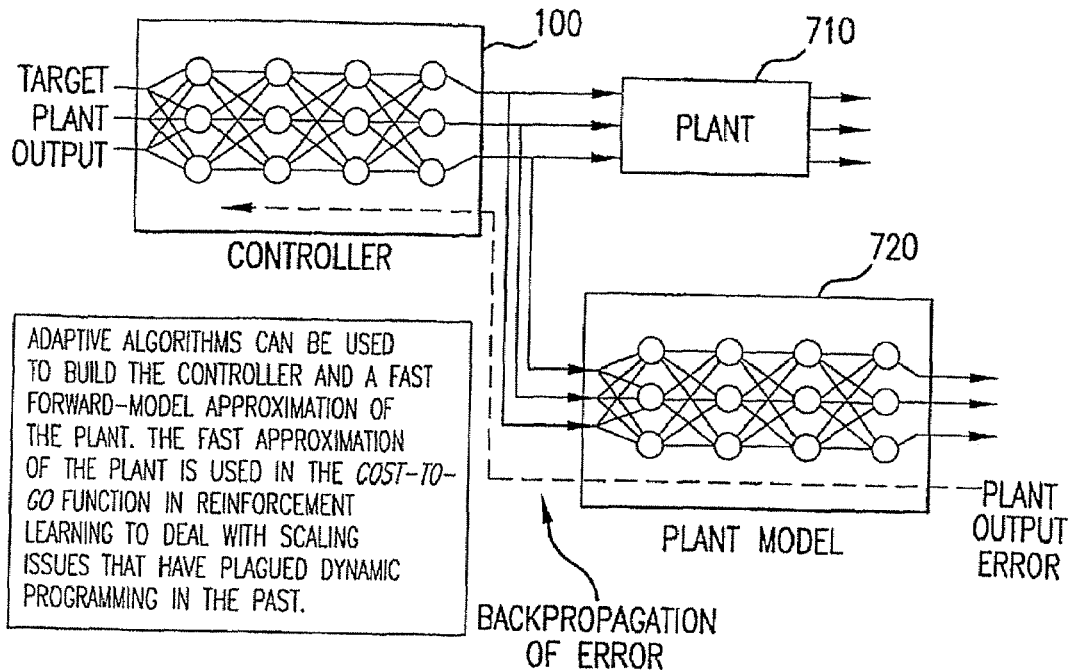
FIGS. 7a and 7b schematically further illustrate the use simulations in the Innervated Stochastic Controller, in accordance with the principles of the present invention.
Figure 7B:
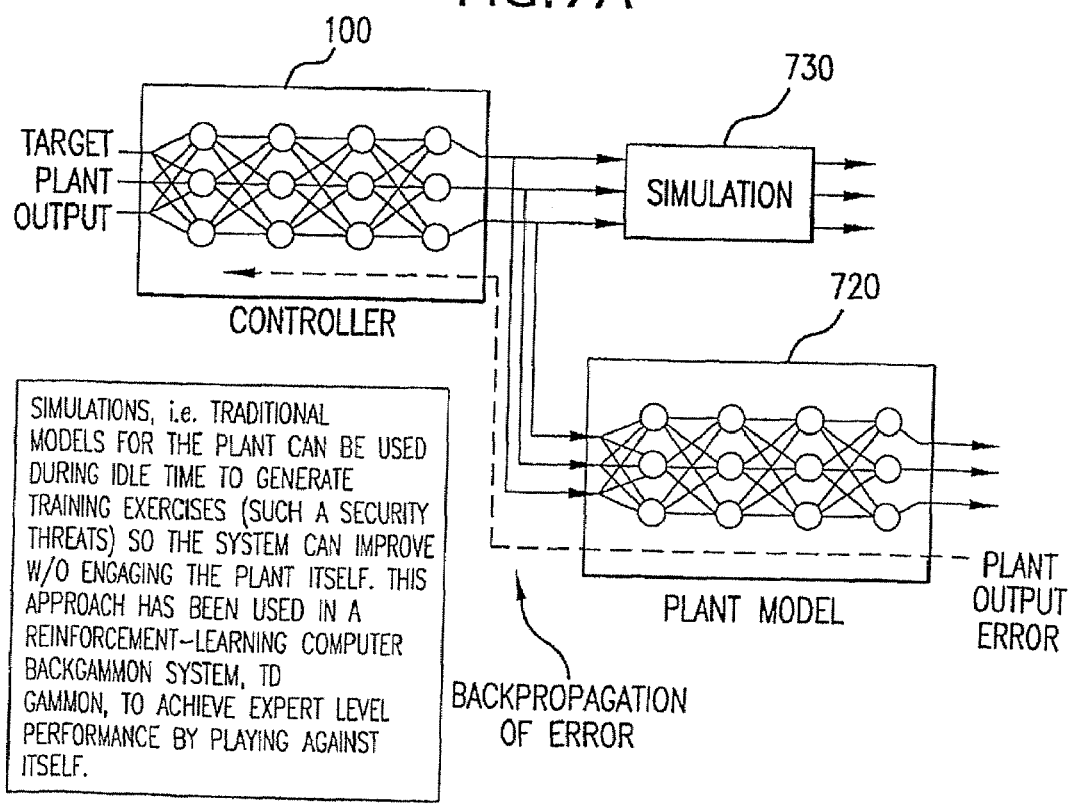

The training or reinforcement learning of ISC 100 may advantageously be compressed in time by the use of simulations of the business operations. FIGS. 6, 7a and 7b schematically show the role of simulation in the training of ISC 100. FIG. 6 shows a general reinforcement learning feed back arrangement in which process output is monitored by a "critic" component to ensure, for example, conformance with previously set performance metrics. Evaluation of the process output by the critic may be is compared with an evaluation of outcomes predicted by a process model. Responses and changes to process operational procedures for optimizing or tuning process performance are broadcast back to the process in a classical feedback loop. FIG. 7a shows ISC 100, which is configured to control plant 710. Reinforcement learning algorithms may be used to build ISC 100 including a fast forward model (720) of plant 710. Scaling issues in dynamic programming computations of the cost-to-go function are avoided by use of the fast forward approximation model 720 of the plant. FIG. 7b shows a simulation 730, which may be used to train ISC 100 during the times when plant 710 is idle or using a parallel offline training configuration. Simulation 710 may include traditional models for the plant 710. Simulation 710 may be configured to generate training exercises (e.g., security threats) for ISC 100 while plant 710 is idle or using a parallel offline training configuration. Thus, reinforcement learning can be accomplished without engaging plant 710. This arrangement of reinforcement learning by ISC 100 is similar to the well-known reinforcement learning computer system TD Gammon, which achieves expert level playing capability by playing against itself.

The inventive stochastic controller may be configured to optimize strategic business objectives and yet at the same time honor all necessary engineering or other physical constraints on business operations. For such configurations of the inventive stochastic controller, an integrated asset model of the subject business process is developed. The integrated asset model may be designed to predict all of the relevant quantities or parameters (e.g., economic, engineering, etc.) that are involved in malting asset management decisions at each level of operation in the business process. The integrated asset model may incorporate all of the necessary engineering or other constraints on the business operations so that the stochastic controller can be trained to avoid operations in undesirable or inaccessible variable space (e.g., the constrained engineering space). FIG. 8 depicts exemplary undesirable or inaccessible operating regions in a plant's operation space as L-, bar- and square-shaped barriers 840, which the stochastic controller can learn to avoid.

Figure 9:
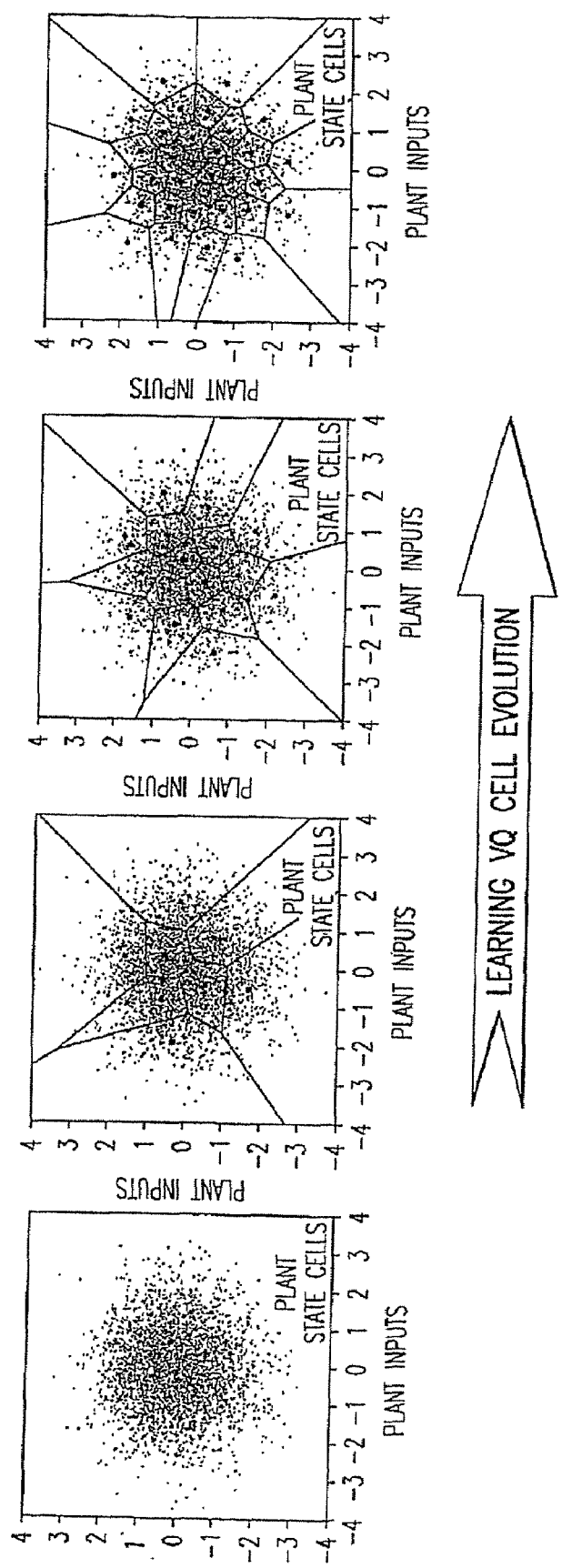
FIG. 9 schematically illustrates the evolution of the set of cells in the VQRL codebook of FIG. 8.

FIG. 8 also shows the use of a vector quantization technique for simplifying reinforcement learning computations of a plant's operations by ISC 100. Suitable vector quantization algorithms or procedures are used to reduce the dimensionality of the input space. FIG. 8 shows an exemplary algorithmic partitioning of the plant state space into 2-dimensional encoding cells. These 2-d cells are represented by codevectors (i.e., numbered points 1-20). The set of cell definitions is commonly referred to as a codebook in information theory terminology. A vector quantization algorithm itself is an adaptive learning algorithm. As new information is obtained or learnt, the codebook cells may be redefined and discretized, thereby further reducing the dimensionality of input space. FIG. 9 figuratively shows a typical evolution of cells in the codebook as the vector quantization adaptive algorithmic progresses in time.

With reference to FIG. 8, ISC 100 may learn optimal actions in response to problem cells (i.e. plant states) using an approximate dynamic programming (reinforcement learning) algorithm. Directional arrows 835 represent the optimal action for each cell that are generated by a trained ISC controller 100. The set of optional actions 835 for all cells may be referred to as a policy or strategy. Trajectory 810 represents a series of optimal actions, which ISC 100 may recommend for moving plant operations to a desired goal 830 from a starting point 820 in the plant state space.

Trajectory 810 avoids the L-, bar-, and square-shaped barriers 840 while traversing the plant's state space. The shape of trajectory 810 is also determined by operational and business policies that may be incorporated in ISC controller 100. The incorporated policies define the actions to be chosen in every state visited by the system. The operational and business policies, which are incorporated in ISC controller 100, may relate to any quantifiable aspect of the business process including, for example, those governing the degree of acceptable risk or the level of expected returns from each action.

Financial institutions often have established policies to use options to hedge their investment portfolios against a spectrum of risk, among them interest rate risk, political risk, and market risk. Traditionally, the use of options has been limited to the finance industry (i.e. for financial instruments). The present invention advantageously enables the use of options to hedge risk in other business processes and operations. The reinforcement learning algorithm (102) of ISC 100 may be adapted to conform to a real options framework or methodology in which opportunity selections (i.e. the actions recommended ISC 100) are valued as options. Such options methodology provides decision—making flexibility in identifying profitable actions despite risks and uncertainties at each level of the subject business process controlled by ISC 100.

The reinforcement learning algorithm used in ISC 100 is particularly suited for tightly integrating real options valuations into RL algorithm 102. In dynamic programming, the problem of real option valuations and optimization can be treated as a stochastic control problem. The problem of optimizing real option value for the stochastic processes may, for example, be formulated as the problem of maximizing the expected value of discounted cash flows (DCF). The approximate dynamic programming technique for real option valuations gives the arbitrage-free price for an action/investment option when the given stochastic processes are constrained to be always in-the-money (i.e. a "martingale") and the risk-free rate of return is used as the DCF discount factor. As reinforcement leaning is a type of approximate dynamic programming, the same reinforcement algorithm framework used in ISC 100 can be used to conduct real option valuation.

FIG. 10 shows the system architecture and the operation of an exemplary stochastic controller system—"Martingale Stochastic Controller (MSC) system 1000", in which business process actions (e.g., in the operation of plant 1200) are evaluated as real options. MSC system 1000 may be designed to conform to a business policy to generate actions or decisions that are always in-the-money (i.e. a martingale) with respect to both financial profitability and engineering efficiency.

MSC system 1000 includes a reinforcement-learning controller 1002, a critic function 1003 that may be coupled to optional learning matrices 1004, and a model 1006 of plant 1200. Plant model 1006 may include temporal descriptions of the plant as a Plant State Vector, a Plant Action Vector, and a set of Plant System Measurements. The Plant State Vector may, for example, be a set of measures of the plant state (i.e. configuration) including information on plant component identification (ID) and types, and variable values for the plant components. The Plant State Vector is used as input for controller 1002. The Plant Action Vector is a set of values, messages, or instructions for placing the plant components into a desired state by each component. The Plant State Vector is used as input for controller 1002. The Plant System Measurements may be a set of measurements of plant condition and output, which can be used by the critic function to monitor plant performance. Model 1006 optionally also may include Configuration Tables, which is a set of named configurations of the plant.

The operation MSC system 1000 can be understood with reference to the learning process steps, which are shown as lettered steps a-d in FIG. 10, and also with general reference to FIGS. 6, 7a and 7b. At an Action Sequence or Policy step d, MSC system 1000 uses approximate dynamic programming (reinforcement learning) to learn optimal actions (i.e. policies) guided, for example, by evaluation signals generated by the critic function. MSC system 1000 may learn and act to control plant 1200 via simulations. For these simulations, MSC system 1000 may take a one kind of action to initialize plant model 1006 into a desired state. This initialization may be accomplished at optional step c by selecting and implementing a named configuration of the plant (from the Configuration Tables). The initialization step d can be repeated so that plant model 1006 can be replayed as many times or as frequently as desired for learning simulations. Another step d in the learning process involves execution of the action on model 1006. Optimal action also may be executed on plant 1200 automatically or by the intervention of appropriate decision-makers via control links 290. At step b, the critic function monitors plant performance (i.e., Plant System Measurements) to provide a feedback training signal to reinforcement controller 1002.

MSC system 1000 can be advantageously implemented to control complex and diverse business processes. MSC system 1000 makes it possible to implement real options as well as regulatory, supervisory and scheduling control, and operational and capacity planning functions that may be necessary to conduct technical and business operations in a businesses process. This capability of MSC 1000 is particularly advantageous for managing remote plant operations (e.g., the downhole "factory" notion in oil and gas extraction in ultra deepwaters).

In an exemplary implementation, MSC system 1000 is configured for ultra deepwater reservoir management applications in the oil and gas production industry. MSC system 1000 may be used to carry remote sub-sea decisions in a real-time affecting the form and timing of gas, oil, and water production in the ultra deepwater based on reinforcement learning. MSC system 1000 can achieve lower level control objectives at the same time that it maximizes the expected value of discounted cash flows under reservoir, technical, and market uncertainties.

For this exemplary implementation, the components of the subject plant 1200 (FIG. 10) may be an "e-Field"—i.e., an integrated asset model of the physical equipment and electronic infrastructure, for real time remote monitoring and control of gas, oil, and water production in ultra deepwater and unconventional gas fields. See e.g., Thomas et al. U.S. Pat. No. 6,266,619 ("Thomas").

Figure 11:
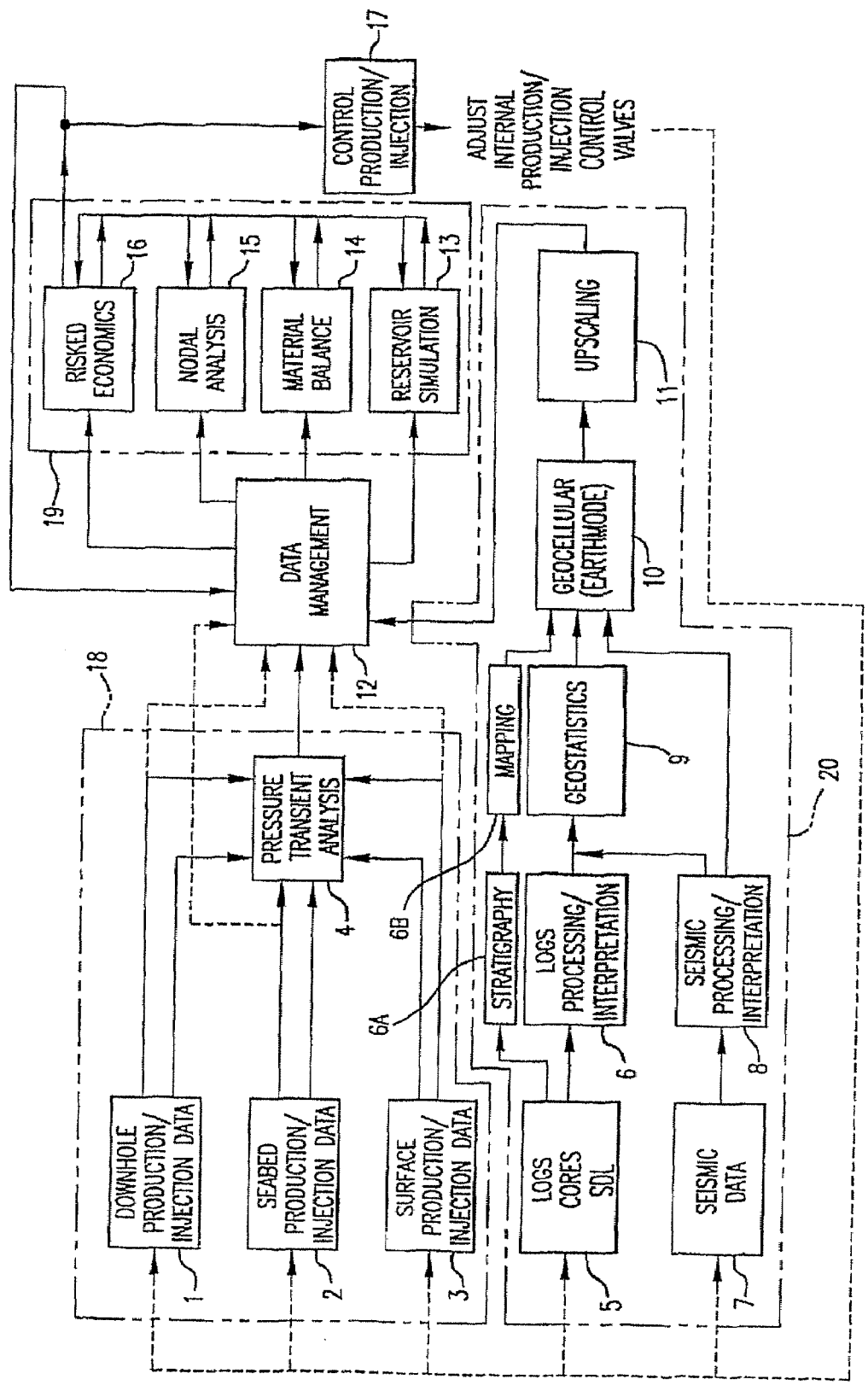
FIG. 11 illustrates the architecture of a prior art E-field system for real time reservoir management.

FIG. 11, which for convenience is reproduced from Thomas, shows the architecture of an exemplary e-Field plant 1100 that may be controlled by MSC system 1000. MSC system 1000 when integrated with e-Field 1100 can implement real options as well as regulatory, supervisory and scheduling control, and operational and capacity planning functions that may be necessary to conduct remote technical and business operations in a unified manner. Real options management of the reservoir assets under the control of MSC system 1000 may involve management of the shape and mix of the production within fields through operational and/or implementation flexibility.

A key to the reinforcement learning approach to the stochastic controller system for the ultra deepwater is the ability to simulate or model the reservoir to surface assets (e.g., oil field plumbing or distribution system). An integrated asset simulation capability may be provided for this purpose. Unlike common real option valuation methods, reinforcement learning by MSC system 1000 can be non-parametric. MSC system 1000 may be configured to directly sample the possible action paths via simulation instead of first building a parametric model of the stochastic variables (including financial variables) of the processes to be controlled. The controller learns from the experience gained by simulations of the business outcomes of flexible engineering decisions (FIGS. 6, 7a and 7b), and provides a series of actions or trajectories that are martingales by maximizing the expected value of DCF. While finding such trajectories, the controller honors the necessary engineering and reservoir physics constraints (such as avoiding skin damage and water coning) in the overall injection and production policy of the field. An integrated reservoir model, which can predict quantities such as skin depth, is useful for identifying the reservoir operation constraints. The engineering predictions of such an integrated reservoir model may be incorporated in the asset simulation capability with the undesirable or constrained operating regions represented as barriers in the operation space (like those represented by the L-, bar-, and square-shaped barriers 840 in FIG. 8).

The Integrated Production Models (IPMs) that are used in MSC system 1000 may include IPMs that are known in the art. Simulation models and techniques that may be useful are described, for example, in John T. Han, "There is Value in Operational Flexibility: An Intelligent Well Application", SPE Hydrocarbon Economics and Evaluation Symposium, Dallas, Tex., 5-8 Apr. 2003 ("SPE 82018"); S. H. Begg and R. B. Bratvold, and J. M. Campbell, "Improving Investment Decisions Using a Stochastic Integrated Asset Model", SPE Annual Technical Conference and Exhibition, New Orleans, La., 30 Sep.-3 Oct. 2001 ("SPE 71414"); C. V. Chow, and M. C. Arnondin, "Managing Risks Using Integrated Production Models: Process Description", Journal or Petroleum Technology, March 2000 ("SPE 57472"); and, Steve Begg, Reidar Bratvold, and John Campbell, "The Value of Flexibility in Managing Uncertainty in Oil and Gas Investments", SPE Annual Technical Conference and Exhibition, San Antonio, Tex., 29 Sep.-2 Oct. 2002 ("SPE 77586"), all of which are incorporated by reference in their entireties herein.

Figure 12A:
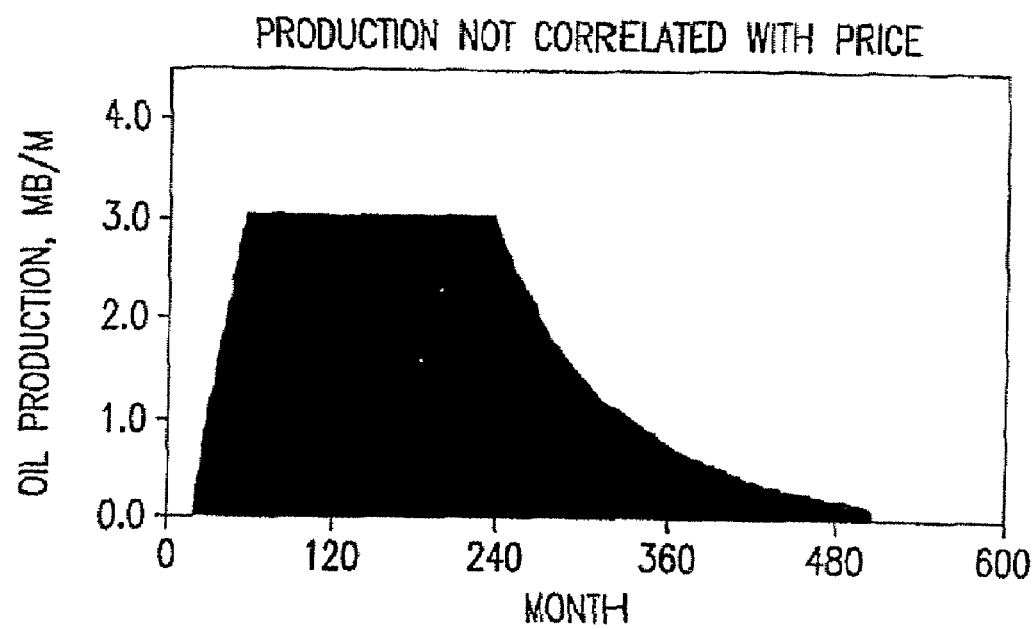
FIGS. 12a-12d illustrate the results of a prior art case study investigation of the value of modulating reservoir production in response to market price signals.
Figure 12B:
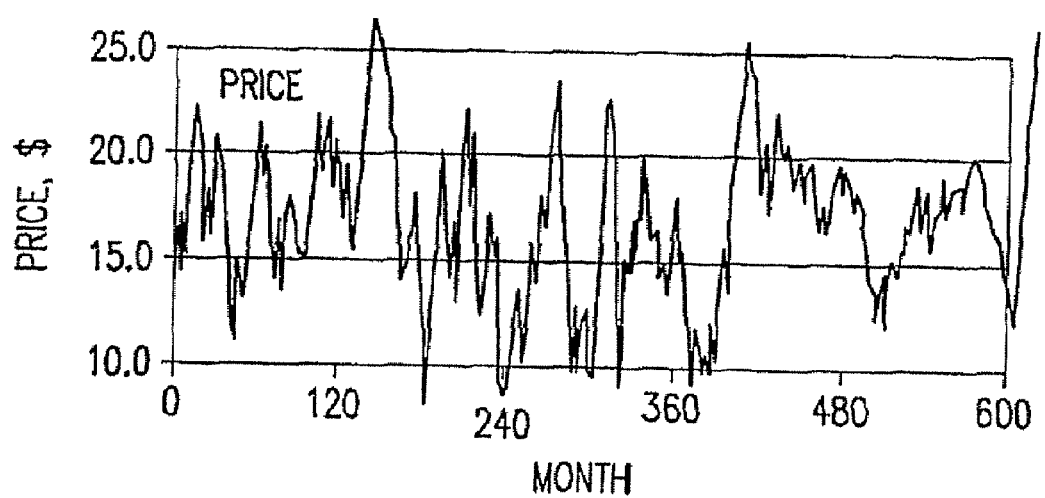
Figure 12C:
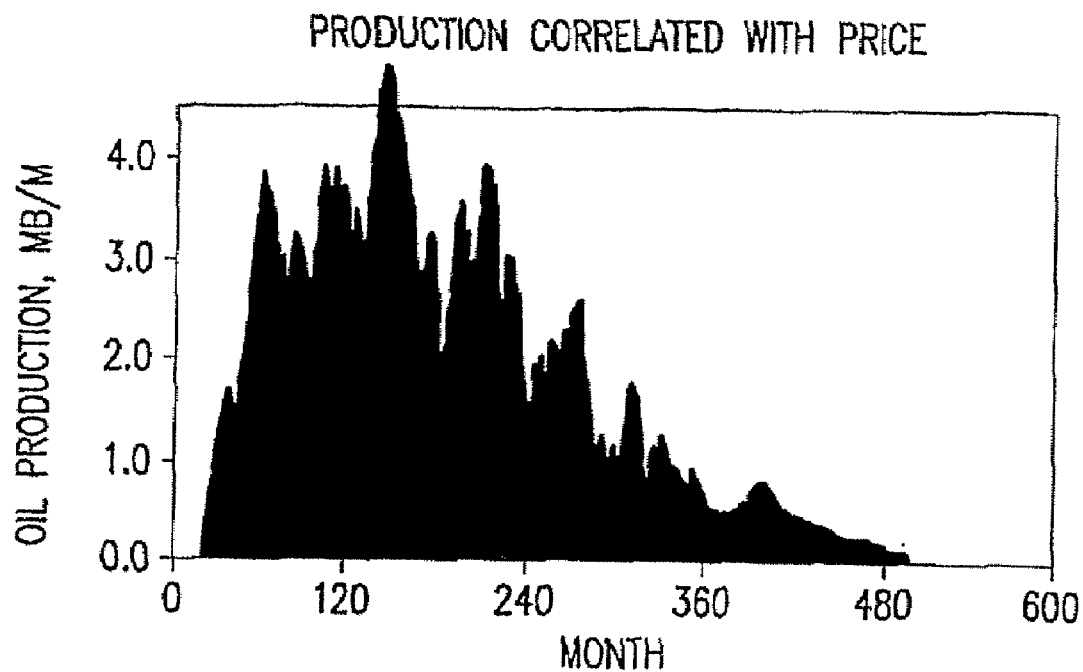
Figure 12D:
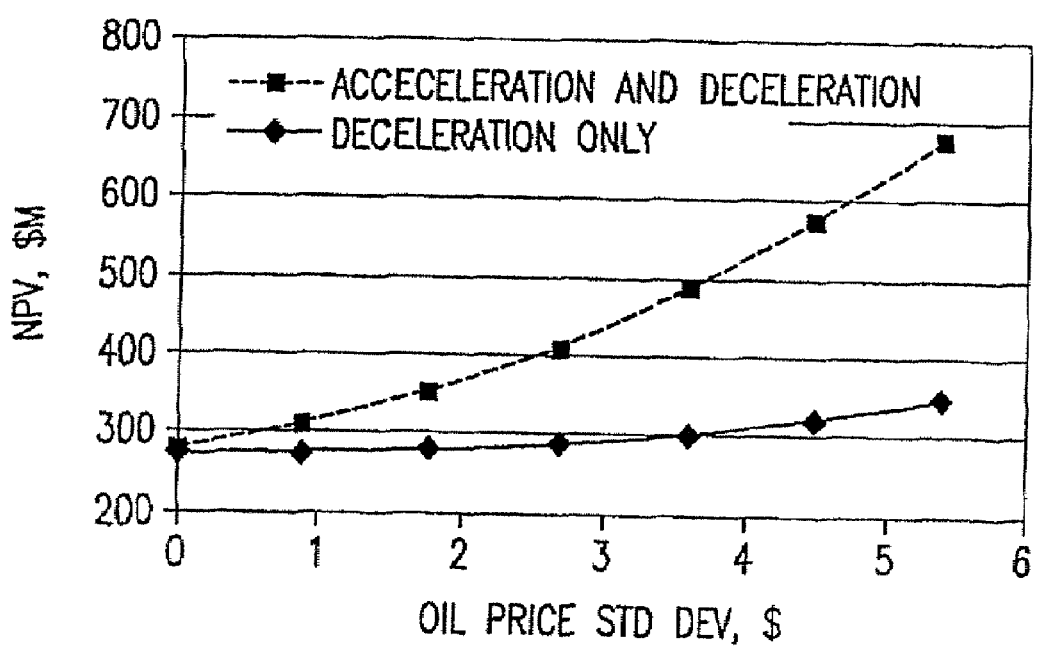

The advantages of using real option valuations to manage assets by application of MSC system 1000 can be appreciated with reference to FIGS. 12a-d. These exemplary figures, which are reproduced from the last cited reference SPE 77586, show the theoretical increase in dollar value (NPV) that can be achieved by flexible control of oil production from an oil field in response to fluctuating market oil price signals (FIG. 12b). The increase in dollar value of a flexible production scheme (FIG. 12c) over a static production scheme (FIG. 12a) is larger as price volatility (oil price std. deviation) increases (FIG. 12d). The increase in dollar value is more significant when both acceleration and deceleration of production are permitted than when only deceleration is permitted (See e.g., top curve vs. bottom curve, FIG. 12d). In practice, MSC system 1000 of the present invention (in conjunction with suitable e-Field technology) may be utilized to modulate field production in real-time according to similar market price signals.

The real time learning algorithm that is used in MSC system 1000 for reservoir management may be developed, and tested or verified using investigations or case studies of historical reservoir production data. In one such case study, production data on a particular deepwater turbidite field—South Timbaler block 295, is used. The South Timbaler block 295 field, which is the Gulf of Mexico's first deepwater turbidite field, has three major producing reservoirs. This field has been previously modeled using seismic imaging software. A reservoir model for South Timbaler block 295 developed for the "4D SeisRes" project is available to conduct such as case study. See e.g., Anderson, R. N., G. Guerin, W. He, A. Boulanger and U. Mello, "4-D Seismic reservoir simulation in a South Timbaler 295 turbidite reservoir", The Leading Edge, 17(10),1416-1418, 1998. The case study investigation is designed to demonstrate that a suitable stochastic controller can maximize the expected value of discounted cash flows (i.e., net present value (NPV)+option value) while at the same time avoiding operational problems in oil field production. The case study can demonstrate that both an increase in value and a reduction of cost would have been achieved if the stochastic controller system MSC system 1000 had been used to select flexible production schedules in response to both production engineering problems and market price signals.

The case study can leverage the 4D SeisRes simulator work to construct a surrogate for a real time stochastic controller applicable to the e-Field real time reservoir management architecture (e.g., FIG. 11). Fast approximate simulations of the reservoir, which are described in SPE 71414, may be used to train the stochastic controller.

The integrated production modeling concepts described in FIG. 11 and SPE 57472 may be used to provide a combined economic/engineering-state space for the path sampling by the stochastic controller to learn from, and then optimize. The integrated asset model for the case study may include a fast ID reservoir model with a commercially available Integrated Production Management (IPM) tool suite (e.g., MBAL, Prosper, and GAP tools sold by Petroleum Experts Inc., of Houston, Tex., 77079). The tool suite enables estimation of engineering reservoir parameters and optimization of operations with respect to estimate parameters that, for example, are shown in FIG. 11. Further, the tool suite may be used to estimate production engineering penalties for any actions causing skin damage and water coning (i.e. create barriers for the optimal action trajectories, FIG. 8).

In the case study, various strategic production shaping objectives may be simulated, for example, Base-load gas, peaking oil production; Base-load oil, peaking gas production; Base-load oil, base-load gas production; and Peaking of both gas and oil production. A description of the notion of peaking and base load production shaping for fields and portfolios may be found, for example, in Roger Anderson and Albert Boulanger, "Flexible manufacturing techniques make ultra deep water attractive to independents", Oil & Gas Journal, Aug. 25, 2003, which is hereby incorporated by reference in its entirety herein.

Figure 13:
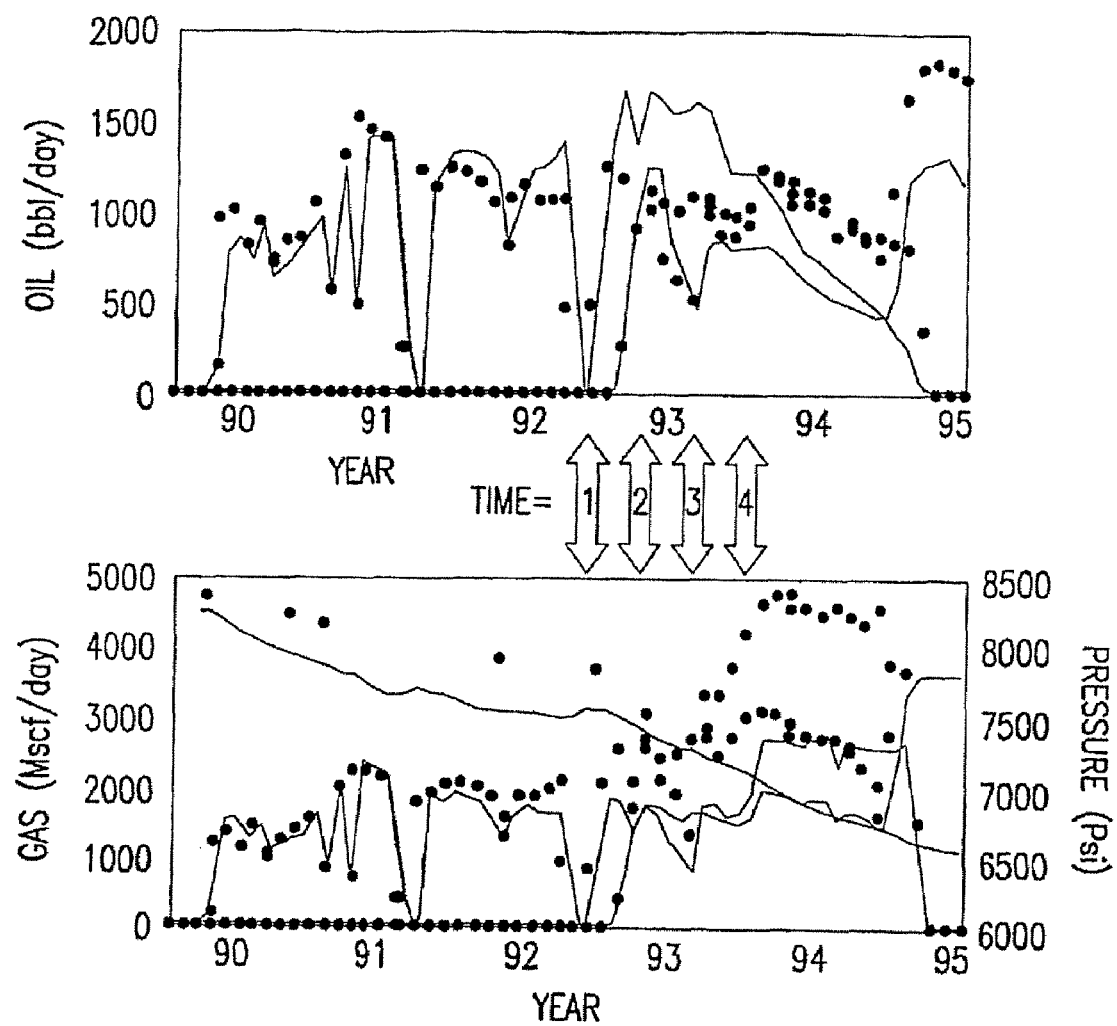
FIG. 13 is a graph illustrating the flexible oil and gas production options generated for reservoir asset management, in accordance with the principles of the present invention.

Exemplary flexible production options were generated from multiple reservoir simulation runs using a VIP Reservoir Simulator (Landmark) to estimate production engineering constraints or penalties. These flexible production options are shown in FIG. 13. The dotted and solid curves shown in FIG. 13 represent possible oil and gas production options for a horizontal well at four occasions (Time=1, 2, 3, 4) relatively late in the production cycle of the field. The curves represent acceptable engineering options for oil (top) and/or gas (bottom) under varying oil and gas price conditions. The oil and gas prices are assumed to be independent. First, in the pricing case where the price of oil is high and that of gas is low, the upper curve represents maximum possible oil production and the lower curve represents minimal gas production. Then, in the pricing case where the oil and gas prices are reversed, the upper dots represent the minimal possible oil production and the lower dots represent the maximum possible gas production. Two pricing cases are shown at Time=4. The first case is for high prices for both oil and gas (dots), and the second case is for low prices for both oil and gas (lines).

The case study investigation may further simulate different water injector and production programs using actual prices for the 1990s, and evaluate the increase in option value for different strategic goals. The return-on-investment of these new production options for the field may be estimated, and compared with the historical program. The effectiveness of the stochastic controller to achieve real time production engineering objectives by simulating the policies derived from the controller may be studied.

For ease in understanding, the steps or tasks involved in the case study-based development of suitable stochastic controller for deepwater reservoir asset management are summarized below:

1. Develop a stochastic controller based on the approximate dynamic programming method of reinforcement learning. Various "curse of dimensionality" reduction methods may be explored including but not limited to VQRL, NDP, and MAXQ.

2. Assemble an integrated reservoir model based on fast 1D simulation and Integrated Production Management software.

3. Gather data set for South Timbaler block 295 and build simplified reservoir and integrated production model (IPM).

4. Establish production constraints based on skin damage, water coning, and breakthrough for selected wells in South Timbaler block 295 fields.

5. Train the stochastic controller to generate production/injection schedules that honor production constraints and produce exemplary field production shapes knowing the resultant price of oil and gas sales and water disposal expense from the 1990s well production history.

6. Derive the total economic value increase (real option value) based on these flexible schedules and the historical baseline and compare with the actual return-on-investment.

7. Identify cost reductions based on optimizing the schedule of engineering interventions in the subsurface via the stochastic controller's ability to minimize and avoid bad production/injection regimes such as skin damage and water coning and breakthrough.

Figure 14:
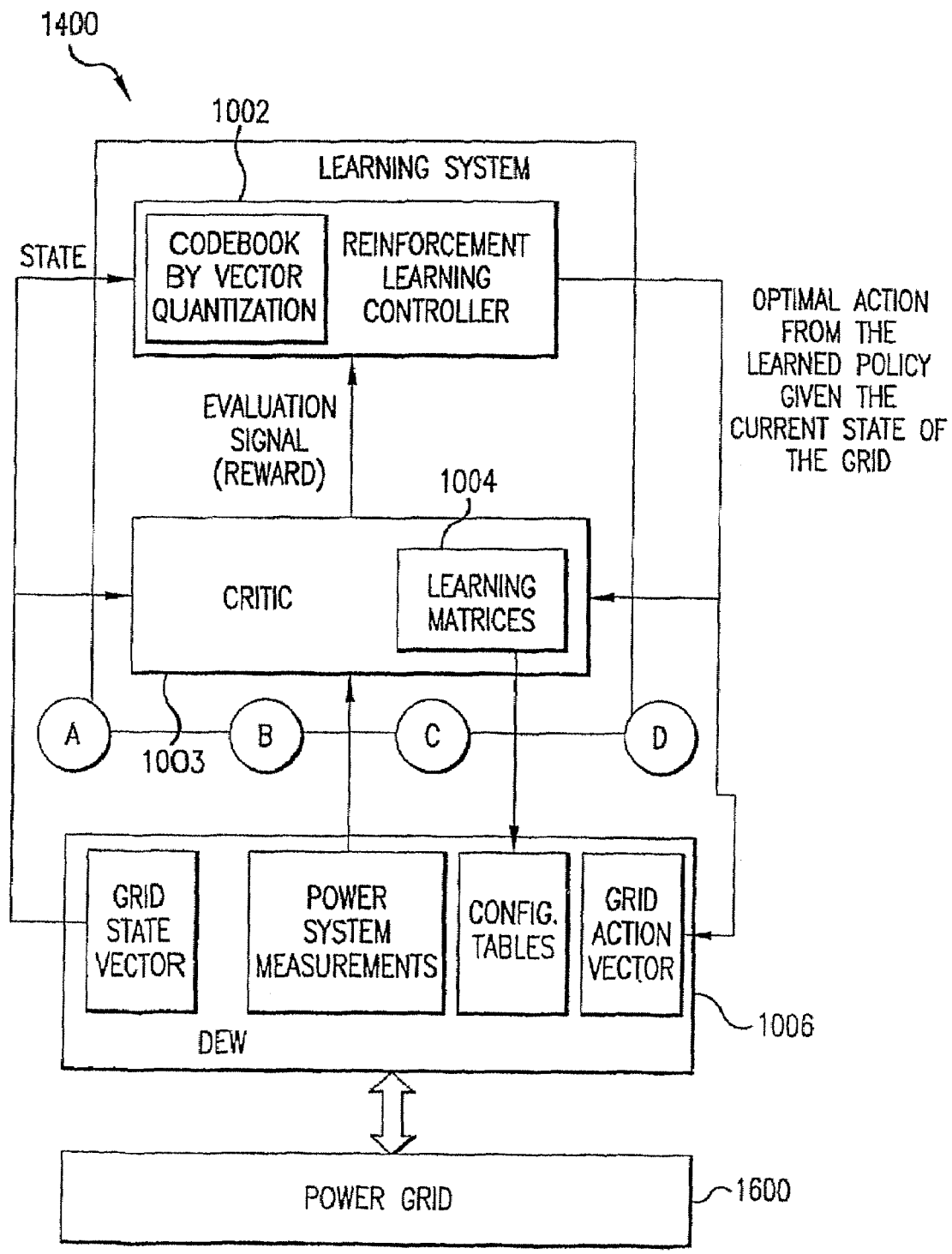
FIG. 14 illustrates the general architecture of an Innervated Stochastic Controller, which is configured as a Learning System for training power grid control operators, in accordance with the principles of the present invention.

The stochastic controllers of the present invention may be designed to control operations in fully automated business process environments (e.g., E-Field oil reservoirs, robotic manufacturing plants or assembly lines) with no or minimal human intervention. However, for some applications, the inventive stochastic controller may be specially configured as learning systems for operator training, for example, for business processes where manual intervention in operations is necessary or desirable. FIG. 14 shows the system architecture and the operation of an exemplary Learning System 1400, which can be set up for training operators of a distributed electrical power grid 1600. Like MSC 1000, learning system 1400 includes a reinforcement-learning controller 1002, optional learning matrices 1004 that are used within critic function 1003, and a model 1006 of power grid 1600. The subject power grid can include regional power generation, transmission, and distribution grids as well as integrated transcontinental power grids (e.g., the North American power grid).

Figure 15:
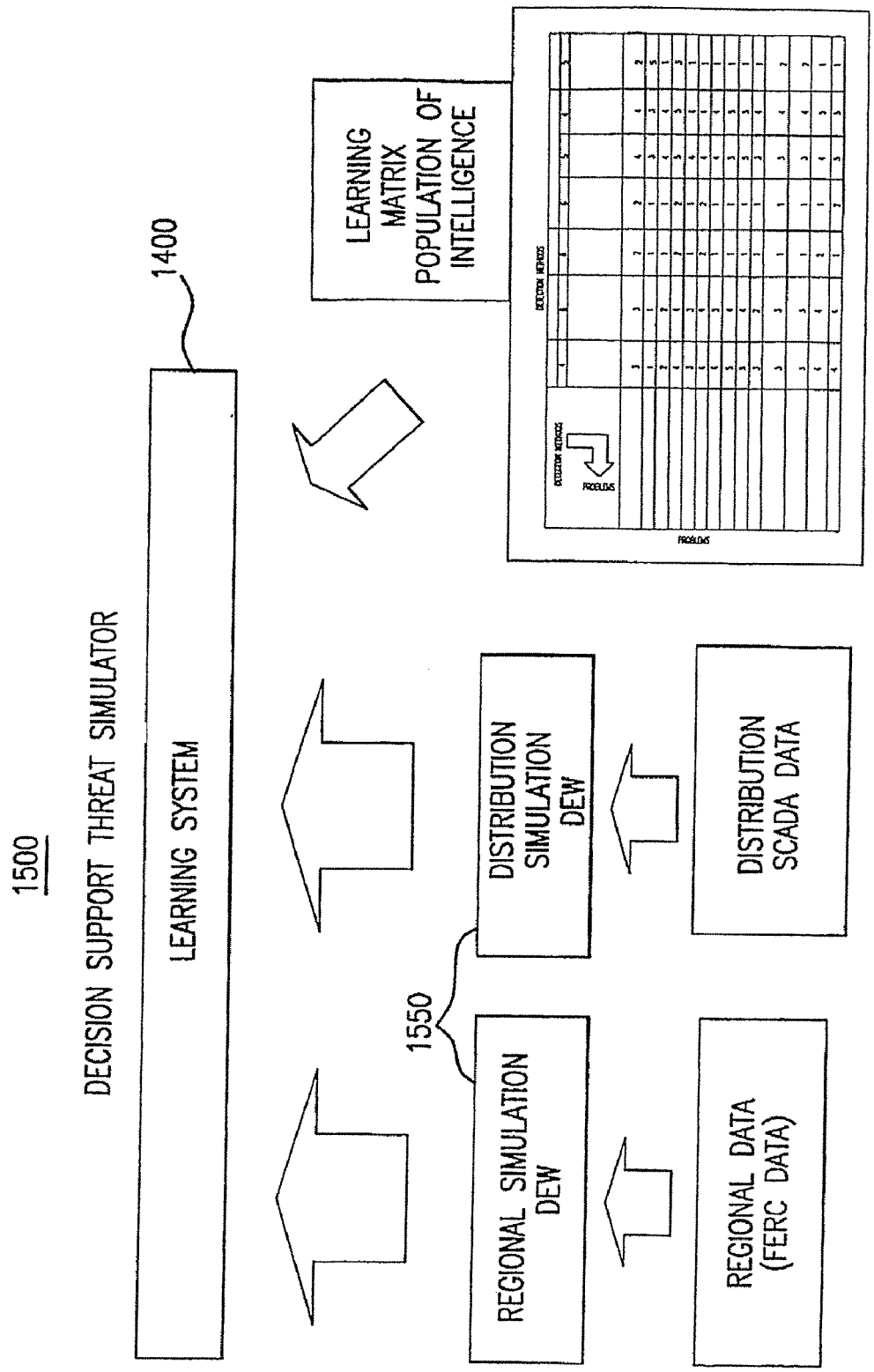
FIG. 15 is a schematic of a computer-based Decision Support Threat Simulator for training power grid control operators to respond to grid exigencies, in accordance with the principles of the present invention.

The Learning System 1400 may be used to train power control system operators, for example, to take suitable actions to respond quickly to fluctuations or interruptions in electricity flow anywhere in the power grid. Learning System 1400 may be configured as a computer-based simulation and training tool (e.g., Decision Support Threat Simulator (DSTS) 1500, FIG. 15) that learns "best response scenarios" to specific events on the grid, which, for example, can lead to critical failure cascades across integrated generation, transmission, and distribution grids such as the North American grid if not controlled.

Learning system 1400 also may be configured to act on its own and take automatic control actions, for example, in response to fast moving events that cannot be quickly or properly responded to manually by human operators. In this configuration, the power grid is subject to mixed automatic and human control. The shifting automatic-manual responsibility for control actions is tracked and learned by the reinforcement learning system and the models it uses.

Using suitable simulation models of the subject power grids, the DSTS can link and analyze specific threat events (e.g., storm outages, normal failure, natural disaster, man-made threats) on power grid 1600, and generate planned and prioritized responses to the specific threat events by analysis of catastrophic grid-wide sequences that the learning system computer has seen or learnt before. The planned responses to specific events may be designed to meet safety, reliability, engineering, security, and financial objectives conjointly.

The learning system computer automatically and continually "learns" as it absorbs, stores, and makes relationships among discrete simulation runs of the power grids. Grid operation intelligence and expertise is extracted and embedded in DSTS 1500 by the use of learning matrices so that optimal learned responses to crises and attacks anywhere on the integrated grid are readily available. Thus, operators using DSTS can be trained and prepared to respond to unforeseen contingencies without the need to run new simulations at the moment. DSTS can identify and optimize answers to the following problems throughout the organization that impact the stability of the grid:

What are the new threats to the grid system?
What are the new failure points in the grid?
What are the new downward propagation patterns or cascading effects?
What are the best response scenarios?

In one implementation of learning system 1400 as a computer-based simulation and training tool (e.g., DSTS 1500 (FIG. 15), the subject regional and distribution power grids are modeled using commercially available power flow and short-circuit modeling tools (such as Distribution Engineering Work Station (DEW), sold by EPRIsolutions, Inc., Palo Alto, Calif. 94304). DEW can, for example, model inverter and synchronous distributed generation power flow, as well as multiple-source fault analysis. DEW is in common use in the power industry as a real-time simulator of a utility's distribution system, for example, in conjunction with the utility's Supervisory Control And Data Acquisition (SCADA) system and/or its energy management system (EMS) and their associated data historian.

DEW also may be used to model regional grid behavior using, for example, Federal Energy Regulatory Commission (FERC) data. DEW models the power flows in the grid, plans peak load leveling, peak shaving, voltage correction, right sizing of equipment, and automated data modeling.

In DSTS 1500, learning system 1400 and DEW simulators 1550 are linked into an integrated software tool. The integrated software tool may be configured, for example, to identify new threats to the grid, pinpoint new failure points in the grid, identify new downward propagation patterns or domino effects, prioritize and plan the restoration sequence in response to a disturbance in the grid; estimate and reduce restoration costs, identify acceptable solutions quickly, select most efficient economic options, eliminate delays in transmitting vital data, and facilitate getting the right data to and from the right people. DSTS 1500 provides a way to eliminate the "wish I could have seen it coming" reaction by making failure models predictive and storing responses and remediation scenarios for grid failures in the future.

Reinforcement learning controller 1002 in learning system 1400 may be implemented using neuro-dynamic programming (NDP) approaches or support vector machines to deal with computationally expensive cost-to-go function evaluations. Expert knowledge for learning matrices 1004 (e.g., similar to FIG. 5) may be derived by scenario playing in "table-top" exercises, in which "war-gaming" experts pose problems and work through the solutions with grid operations experts. The learning matrices are used to guide the generation of simulation-based scenarios as well as used for the critic function in the reinforcement-learning algorithm. It will be understood that the application of DSTS to simulate and/or control power grid 1600 is exemplary. DSTS 1500 can be suitably extended or reconfigured to cover asset management threats to any interrelated infrastructure for which coupled models of the infrastructures of interest are available. An example of a coupled infrastructure model is the Interdependent Infrastructure Modeling, Simulation, and Analysis Project (SOFIA) model developed by the D4 Division of Los Alamos National Labs. Using such a coupled infrastructure model, DSTS 1500 may be, for example, used to cover asset management threats to interrelated gas and oil supply and power infrastructures, or interrelated communications and power infrastructures. Other exemplary interrelated infrastructures of interest to which DSTS 1500 may be applied include water supply and power, transportation and power, and earth hazards and power.

Furthermore it is possible to use DSTS for threats to infrastructures that are not directly related to power such as ports and transportation hubs or transportation networks if simulations are available. An example of such a simulation is the port simulator, PORTSIM developed by the Decision and Information Science Division, Argonne National Laboratory. Another example is the transportation simulator TRANSIM, developed by the D4 division, Los Alamos National Laboratory and marketed by IBM Business Consulting.

In accordance with the present invention, software (i.e., instructions) for implementing the aforementioned innervated stochastic controllers and systems can be provided on computer-readable media. It will be appreciated that each of the steps (described above in accordance with this invention), and any combination of these steps, can be implemented by computer program instructions. These computer program instructions can be loaded onto a computer or other programmable apparatus to produce a machine, such that the instructions, which execute on the computer or other programmable apparatus create means for implementing the functions of the aforementioned innervated stochastic controllers and systems. These computer program instructions can also be stored in a computer-readable memory that can direct a computer or other programmable apparatus to function in a particular manner, such that the instructions stored in the computer-readable memory produce an article of manufacture including instruction means which implement the functions of the aforementioned innervated stochastic controllers and systems. The computer program instructions can also be loaded onto a computer or other programmable apparatus to cause a series of operational steps to be performed on the computer or other programmable apparatus to produce a computer implemented process such that the instructions which execute on the computer or other programmable apparatus provide steps for implementing the functions of the aforementioned innervated stochastic controllers and systems. It will also be understood that the computer-readable media on which instructions for implementing the aforementioned innervated stochastic controllers and systems are be provided, include without limitation, firmware, microcontrollers, microprocessors, integrated circuits, ASICS, and other available media.

It will be understood, further, that the foregoing is only illustrative of the principles of the invention, and that various modifications can be made by those skilled in the art, without departing from the scope and spirit of the invention, which is limited only by the claims that follow.

The invention claimed is:

1. A method for providing decision-making support under uncertainty in a multi-level business process, wherein process events can be stochastic events, the method comprising:

using reinforcement learning to train an adaptive stochastic control algorithm on a process model, which includes a unified representation of the multi-level business process, to have prediction capability; and deploying the adaptive stochastic control algorithm having prediction capability to generate a schedule of optimal actions through time in response to a process situation, thereby providing decision-making support under uncertainty in the multi-level business process.

2. The method of claim 1, wherein deploying the adaptive stochastic control algorithm comprises approximate dynamic programming in the form of reinforcement learning.

3. The method of claim 1, further comprising using process simulations to train the adaptive stochastic control algorithm.

4. The method of claim 1, wherein using a process model comprises using a fast forward approximation of the process.

5. The method of claim 1, wherein the process model comprises an integrated asset model which recognizes constraints on process operation space, and wherein training the adaptive stochastic control algorithm comprises training the algorithm to generate optimal actions that avoid constrained process operation space.

6. The method of claim 1, further comprising integrating real option valuations in the adaptive stochastic control algorithm to generate a schedule of optimal actions through time in response to a process situation.

7. The method of claim 6, wherein the adaptive stochastic control algorithm is trained to always generate actions that are in-the-money.

8. An innervated stochastic controller for providing decision-making support in multiple levels of a business process, the stochastic controller comprising:

an adaptive reinforcement learning algorithm having prediction capability for generating a schedule of actions through time in response to a process situations of the business process; and a process model of the business process, wherein the adaptive reinforcement learning algorithm is trained on a forward model to generate a schedule of optimal actions through time in response to the process situations.

9. The innervated stochastic controller of claim 8, wherein the adaptive reinforcement learning algorithm comprises approximate dynamic programming.

10. The innervated stochastic controller of claim 8, further comprising process simulations to train the adaptive reinforcement learning algorithm.

11. The innervated stochastic controller of claim 8, wherein the process model comprises a fast forward approximation of the process.

12. The innervated stochastic controller of claim 8, wherein the process model comprises an integrated asset model which recognizes constraints on process operation space, and wherein the adaptive reinforcement learning algorithm having prediction capability is trained to generate actions that avoid constrained process operation space.

13. The innervated stochastic controller of claim 8, wherein the adaptive reinforcement learning algorithm having prediction capability is trained to always generate actions that are in-the-money.

14. A martingale stochastic controller system for providing decision-making support in multiple levels of a business process, the stochastic controller system comprising:

an adaptive reinforcement learning controller having prediction capability for generating actions through time in response to process situations of the business process by evaluating real options; and a process model of the business process, wherein the adaptive reinforcement learning algorithm having prediction capability is trained on the process model to generate optimal actions of the business process through time, and wherein the optimal actions are martingales.

15. A martingale stochastic controller system for providing decision-making support of a business process, the stochastic controller system comprising:
- an adaptive reinforcement learning controller having prediction capability for generating actions through time in response to business process situations by evaluating real options, wherein the reinforcement learning controller comprises a representation of the business process inputs; and
- a process model of the business process, the model comprising a business process state vector and business process system measurements, wherein the adaptive reinforcement learning controller having prediction capability is trained on the process model to generate optimal actions of the business process through time that are martingales.

16. A decision support threat simulator (DSTS) for training power grid control operators to respond to grid exigencies, the DSTS comprising;
- a power grid simulator;
- a learning system for learning power grid behavior from simulations using the power grid simulator, wherein the learning system comprises:
- an adaptive reinforcement learning controller having prediction capability; and
- a critic function, wherein the adaptive reinforcement learning controller is trained on power grid simulations in conjunction with the critic function to analyze specific events on the power grid and to generate planned responses through time to the specific events.

17. The DSTS of claim 16, wherein the planned responses through time to specific events are designed to meet a combination of safety, reliability, engineering, security, and financial objectives.

18. The DSTS of claim 16, wherein the adaptive reinforcement-learning controller having prediction capabilities makes relationships between individual power grid simulations and stores optimal learned responses to grid events for operator use.

19. The DSTS of claim 16, wherein the power grid simulator is a real-time simulator of a utility's power distribution system, and wherein the power grid simulator is used in conjunction with the utility's Supervisory Control and Data Acquisition System and/or its energy management system (EMS) and their associated data historian.

20. The DSTS of claim 16, wherein offline reinforced learning is used to train the system.

21. The DSTS of claim 16, wherein reinforced learning to train the system is conducted using online power grid operations in a shadow mode.

22. A computer readable medium for providing decision-making support in multiple levels of a business process, the computer readable medium comprising:
- an adaptive reinforcement learning algorithm having prediction capability for generating actions through time in response to process situations of the business process; and
- a set of instructions for training the adaptive reinforcement learning algorithm having prediction capability on a process model of the business process to generate optimal actions through time.

23. The computer readable medium of claim 22 wherein the adaptive reinforcement learning algorithm having prediction capability comprises approximate dynamic programming.

24. The computer readable medium of claim 22, wherein the adaptive reinforcement learning algorithm having prediction capability comprises an algorithm for valuing real options.

25. The computer readable medium of claim 22, wherein the set of instructions for training comprises instructions for training the adaptive reinforcement learning algorithm having prediction capability to always generate actions through time that are in-the-money.

26. A computer readable medium for training power grid control operators to respond to grid exigencies, the computer readable medium comprising a set of instructions operable to direct the functions of a power grid simulator, and a learning system for learning power grid behavior from simulations using the power grid simulator, wherein the learning system comprises an adaptive reinforcement learning controller having prediction capability and a critic function, so as to train the adaptive reinforcement learning controller having prediction capability on power grid simulations in conjunction with the critic function to analyze specific events on the power grid and to generate planned responses through time to the specific events.

* * * * *